(12) United States Patent
Shi et al.

(10) Patent No.: US 11,509,374 B2
(45) Date of Patent: Nov. 22, 2022

(54) METHOD FOR DETERMINING INDEX OF ORTHOGONAL BASIS VECTOR AND DEVICE

(71) Applicant: VIVO MOBILE COMMUNICATION CO., LTD., Guangdong (CN)

(72) Inventors: Yuan Shi, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/346,072

(22) Filed: Jun. 11, 2021

(65) Prior Publication Data

US 2021/0306048 A1 Sep. 30, 2021

Related U.S. Application Data

(63) Continuation of application No. PCT/CN2019/106940, filed on Sep. 20, 2019.

(30) Foreign Application Priority Data

Dec. 13, 2018 (CN) .......................... 201811527399.3

(51) Int. Cl.
*H04B 7/02* (2018.01)
*H04B 7/06* (2006.01)
(Continued)

(52) U.S. Cl.
CPC ......... *H04B 7/0634* (2013.01); *H04B 7/0417* (2013.01); *H04B 7/0456* (2013.01); *H04B 7/0626* (2013.01); *H04B 7/0639* (2013.01)

(58) Field of Classification Search
CPC .. H04B 7/0634; H04B 7/0417; H04B 7/0456; H04B 7/0626; H04B 7/0639; H04B 7/06;
(Continued)

(56) References Cited

U.S. PATENT DOCUMENTS

2012/0106384 A1 5/2012 Zhang et al.
2013/0163462 A1* 6/2013 Ohwatari ............... H04L 1/0036
370/252
(Continued)

FOREIGN PATENT DOCUMENTS

CN 102006108 A 4/2011
CN 103516494 A 1/2014
(Continued)

OTHER PUBLICATIONS

Samsung, "Summary of CSI enhancement for MU-MIMO support" 3GPP TSG RAN WG1 Meeting #95, R1-1813002, pp. 1-9, (Nov. 16, 2018).
(Continued)

*Primary Examiner* — Helene E Tayong
(74) *Attorney, Agent, or Firm* — Maschoff Brennan

(57) ABSTRACT

Some embodiments of this disclosure provide a method for determining an index of an orthogonal basis vector and a device. The method includes: receiving position information, where the position information is associated with an orthogonal basis vector; and determining at least one first index set based on the position information, where the first index set represents a set of column indices of a plurality of orthogonal basis vectors in an orthogonal basis matrix.

15 Claims, 4 Drawing Sheets

(51) Int. Cl.
    *H04B 7/0417* (2017.01)
    *H04B 7/0456* (2017.01)
(58) Field of Classification Search
    CPC .. H04B 7/0486; H04B 7/0632; H04B 7/0658; H04B 7/063
    USPC .......................................................... 375/267
    See application file for complete search history.

(56) References Cited

U.S. PATENT DOCUMENTS

| | | | |
|---|---|---|---|
| 2014/0219373 A1 | 8/2014 | Mobasher et al. | |
| 2016/0119097 A1 | 4/2016 | Nam et al. | |
| 2016/0134343 A1* | 5/2016 | Nam | H04B 7/0452 375/267 |
| 2020/0052748 A1* | 2/2020 | Kim | H04B 7/0632 |
| 2021/0143971 A1* | 5/2021 | Shim | H04L 25/022 |

FOREIGN PATENT DOCUMENTS

| | | |
|---|---|---|
| CN | 103609042 A | 2/2014 |
| WO | 2017/011478 A1 | 1/2017 |

OTHER PUBLICATIONS

International Search Report and Written Opinion dated Dec. 20, 2019 as received in Application No. PCT/CN2019/106940.
EP Search Report in Application No. 19896912.3 dated Jan. 11, 2022.
"Discussion on CSI enhancement" 3GPP TSG RAN WG1 Meeting #95, Huawei, HiSilicon, R1-1812242, Nov. 12, 2018.
"Enhancements on Type-II CSI reporting" 3GPP TSG-RAN WG1 #94-Bis, Fraunhofer IIS, Fraunhofer HHI, R1-1811088, Oct. 8, 2018.
"Type II CSI overhead reduction" 3GPP TSG RAN#95, R1-1813357, Motorola Mobility/Lenovo, Nov. 12, 2018.
Japanese Office Action dated Jun. 27, 2022 as received in application No. 2021-533653.
Nokia, "CSI Enhancements for MU-MIMO Support" 3GPP TSG RAN WG1 Meeting #94-bis, R1-1811406, Oct. 8, 2018.
Frounhofer IIS, Frounhofer HHI, "Enhancements on Type-ll CSI reporting" 3GPP TSG-RAN WG1 #95 R1-1813130, Nov. 12, 2018.

\* cited by examiner

METHOD FOR DETERMINING INDEX OF ORTHOGONAL BASIS VECTOR AND DEVICE

CROSS-REFERENCE TO RELATED APPLICATIONS

This application is a continuation application of a PCT Application No. PCT/CN2019/106940 filed on Sep. 20, 2019, which claims priority to Chinese Patent Application No. 201811527399.3, filed in China on Dec. 13, 2018, which is incorporated herein by reference in its entirety.

TECHNICAL FIELD

Some embodiments of this disclosure relate to the field of communications technologies, and specifically, to a method for determining an index of an orthogonal basis vector and a device.

BACKGROUND

A terminal needs to feed back an orthogonal basis vector in Type II channel state information (CSI) feedback to a network device.

However, the orthogonal basis vector feedback methods in the related art cause relatively large feedback overheads.

SUMMARY

One objective of some embodiments of this disclosure is to provide a method for determining an index of an orthogonal basis vector and a device, to resolve a problem of relatively large feedback overheads of the orthogonal basis vector.

According to a first aspect in some embodiments of this disclosure, a method for determining an index of an orthogonal basis vector is provided, applied to a network device, where the method includes:

receiving position information, where the position information is associated with an orthogonal basis vector; and determining at least one first index set based on the position information, where the first index set represents a set of column indices of a plurality of orthogonal basis vectors in an orthogonal basis matrix.

According to a second aspect in some embodiments of this disclosure, a method for determining an index of an orthogonal basis vector is further provided, applied to a terminal, where the method includes:

determining position information, where the position information is associated with an orthogonal basis vector; and transmitting the position information to a network device, where the position information is for use by the network device to determine at least one first index set, and the first index set represents a set of column indices of a plurality of orthogonal basis vectors in an orthogonal basis matrix.

According to a third aspect in some embodiments of this disclosure, a network device is further provided, including:

a receiving module, configured to receive position information, where the position information is associated with an orthogonal basis vector; and a first determining module, configured to determine a first index set based on the position information, where the first index set represents a set of column indices of a plurality of orthogonal basis vectors in an orthogonal basis matrix.

According to a fourth aspect in some embodiments of this disclosure, a terminal is further provided, including:

a second determining module, configured to determine position information, where the position information is associated with an orthogonal basis vector; and a transmitting module, configured to transmit the position information to a network device, where the position information is for use by the network device to determine a first index set, and the first index set represents a set of column indices of a plurality of orthogonal basis vectors in an orthogonal basis matrix.

According to a fifth aspect in some embodiments of this disclosure, a network device is further provided, including: a processor, a memory, and a program stored in the memory and capable of running on the processor, where when the program is executed by the processor, the steps of the method for determining an index of an orthogonal basis vector according to the first aspect are implemented.

According to a sixth aspect in some embodiments of this disclosure, a terminal is further provided, including: a processor, a memory, and a program stored in the memory and capable of running on the processor, where when the program is executed by the processor, the steps of the method for determining an index of an orthogonal basis vector according to the second aspect are implemented.

According to a seventh aspect in some embodiments of this disclosure, a computer-readable storage medium is further provided, where the computer-readable storage medium stores a computer program, and when the computer program is executed by a processor, the steps of the method for determining an index of an orthogonal basis vector according to the first or second aspect are implemented.

In some embodiments of this disclosure, the set of column indices of the plurality of orthogonal basis vectors in the orthogonal basis matrix may be determined based on the received position information, which can reduce feedback overheads of the orthogonal basis vectors.

BRIEF DESCRIPTION OF DRAWINGS

Those of ordinary skill in the art will be clear about other advantages and benefits by reading detailed description of the optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

Figure 1:
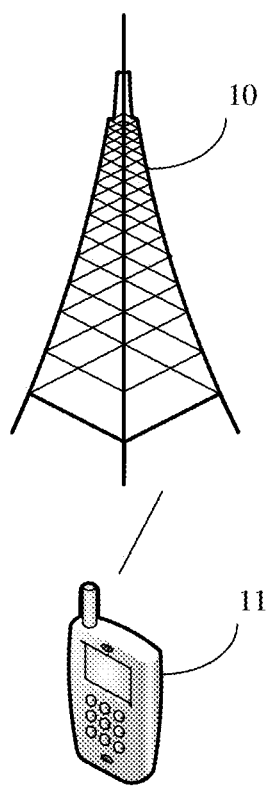
FIG. 1 is a schematic architectural diagram of a wireless communications system according to some embodiments of this disclosure.

The following clearly describes the technical solutions in some embodiments of this disclosure with reference to the accompanying drawings in some embodiments of this disclosure. Apparently, the described embodiments are some but not all of the embodiments of this disclosure. All other embodiments obtained by persons of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, the word such as "exemplary" or "for example" is used to represent giving an example, an instance, or an illustration. Any embodiment or design scheme described as "an example" or "for example" in some embodiments of this disclosure should not be construed as being more preferred or advantageous than other embodiments or design schemes. Specifically, the terms such as "an example" or "for example" are used to present related concepts in a specific manner.

To help better understand the technical solutions of some embodiments of this disclosure, the following technical points are introduced firstly:

I. Type-II Channel State Information (CSI) Feedback:

In new radio (NR) release 15 (Rel-15), CSI feedback has been enhanced. There are two types of CSI feedback: Type I and Type II. Type-II CSI is a further enhancement of the advanced CSI feedback introduced in release 14 (Rel-14). An idea of using a linear combination (LC) of spatial orthogonal basis to approach CSI (for example, channel eigenvalue vector) is that:

(1) L orthogonal beams (L may be 2, 3, 4 configured by the base station) are selected from over-sampled 2-dimensional discrete Fourier transform (2D DFT) beams, and an orthogonal beam selection is wideband, and applies to all ranks, that is, layers.

(2) Corresponding combining coefficients of the L orthogonal beams at each layer (each eigenvalue vector) are calculated, and amplitudes and phases or phase angle values of the L orthogonal beams are quantized Amplitude quantization of the combining coefficients may be configured as wideband quantization (subband Amplitude=false) or wideband quantization and subband quantization (subband Amplitude=true). Phase angle quantization of the combining coefficients is done on each subband.

A type II CSI report may still be written in a $W_1 \times W_2$ two-level codebook structure.

$W_1$ is wideband information. $W_1$ may include: (1) an index of an orthogonal beam group to which a selected orthogonal beam belongs, (2) an index of the selected orthogonal beam in the orthogonal beam group, (3) an index of an orthogonal beam corresponding to the strongest combining coefficient on each layer, and (4) quantized values of wideband combining coefficient amplitudes on each layer.

$W_2$ is subband information. If the amplitude quantization is configured for wideband reporting, $W_2$ may include: (1) phase angle quantization values of non-zero combining coefficients of each subband on each layer; and if the amplitude quantization is configured for subband reporting, $W_2$ may also include: (2) a quantized value of a ratio of non-zero combining coefficients of each subband on each layer to quantized values of wideband amplitudes.

Type II CSI feedback includes: Part 1 and Part 2. Part 1 has a fixed payload size. Part 1 may include: a rank indicator (RI), a channel quality indicator (CQI), and an indicator of the number of non-zero amplitude coefficients of wideband on each layer; and Part 2 may include a precoding matrix indicator (PMI). Part 1 and Part 2 are coded separately. A payload size of Part 2 may be determined based on the information of Part 1.

When a type-II CSI report is transmitted on a physical uplink shared channel (PUSCH), because a base station cannot know the CSI feedback, especially the payload size of Part 2, the allocated PUSCH resource may be insufficient for the full CSI report. Therefore, Rel-15 stipulates that user equipment (UE) discards partial content of Part 2 without feedback.

Assuming that N CSI reports need to be fed back in one slot, a CSI discard priority for Part 2 is as follows: Priority 0 is the highest priority, that is, content of the CSI report to be transmitted first; and priority 2N is the lowest priority, that is, content of the CSI report to be discarded first. CSI report content with the low priority is discarded as a whole. Table 1 shows CSI report content corresponding to each priority.

TABLE 1

Priority (Priority) 0:
Wideband CSI in Part 2 of CSI Reporting 1 to CSI Reporting N
Priority 1:
Even subband CSI in Part 2 of CSI Reporting 1
Priority 2:
Odd subband CSI in Part 2 of CSI Reporting 1
Priority 3:
Even subband CSI in Part 2 of CSI Reporting 2
Priority 4:
Odd subband CSI in Part 2 of CSI Reporting 2
.
.
.
Priority 2N−1:
Even subband CSI in Part 2 of CSI Reporting N
Priority 2N:
Odd subband CSI in Part 2 of CSI Reporting N Under the condition that the PUSCH resource cannot load the complete CSI report content, the CSI part of Part 2 is discarded level by level.

In Rel-15, Type II CSI is essentially compressed in spatial domain, but feedback overheads are still relatively large. The feedback overhead of Type II CSI depends on the RI, the number of subbands, and the like. Therefore, release 16 (Rel-16) considers to reduce feedback overheads based on Type II CSI feedback. At present, to reduce overheads, frequency domain compression based on frequency domain correlation, time domain compression based on sparse time domain impulse responses, and a frequency domain difference method may be used.

A type II CSI procedure may be described as follows:
A codebook on subband m is written as:

$$(W^{(m)})_{2N_1N_2 \times R} = (W_1)_{2N_1N_2 \times 2L}(W_2^{(m)})_{2L \times R} = \begin{bmatrix} B & 0 \\ 0 & B \end{bmatrix} W_2^{(m)}$$

$$= \begin{bmatrix} b_1, \ldots, b_L & 0 \\ 0 & b_1, \ldots, b_L \end{bmatrix} W_2^{(m)}$$

$$= [b'_1, \ldots, b'_{2L}] \begin{bmatrix} c_{1,1}^{(m)} & c_{1,R}^{(m)} \\ \vdots & \ldots & \vdots \\ c_{2L,1}^{(m)} & c_{2L,R}^{(m)} \end{bmatrix}$$

where, $W^{(m)}$ represents the codebook on subband m; $W_2^{(m)}$ represents a second-level codebook on subband m; B represents L 2D-DFT beam vectors; and $b_L$ represents a selected 2D DFT beam vector; and $N_1$ and $N_2$ are respectively the number of CSI-RS ports in two dimensions, R is the number of ranks; $b'_1$ is an orthogonal vector composed of 2D-DFT beam vectors, $c_{l,r}^{(m)}$ is a combining coefficient of the $l^{th}$ orthogonal beam vector at the $r^{th}$ layer in the frequency domain granularity m (for example, a subband, a resource block (Resource Block, RB), or the like), where r=1, 2, ..., R, and l=1, 2, ..., 2L.

If combining coefficients of all subbands are cascaded together, a precoding matrix of the $r^{th}$ layer in frequency domain is obtained:

$$(W_r)_{2N_1N_2 \times M} = (W_1)_{2N_1N_2 \times 2L}(W_{2,r})_{2L \times M} = [b'_1, \ldots, b'_{2L}] \begin{bmatrix} c_{1,r}^{(1)} & c_{1,r}^{(M)} \\ \vdots & \ldots & \vdots \\ c_{2L,r}^{(1)} & c_{2L,r}^{(M)} \end{bmatrix}$$

where, $c_{l,r}^{(m)}$ is a combining coefficient of the $l^{th}$ orthogonal beam vector at the $r^{th}$ layer in frequency domain granularity m (for example, a subband, an RB, or the like), where r=1, 2, ..., R, and l=1, 2, ..., 2L; the $l^{th}$ row in $W_{2,r}$ represents combining coefficients of beam vectors $b'_1$ on all subbands; and M represents the number of columns of a transform domain matrix.

II. Frequency Domain Compression and Time Domain Compression:

On the one hand, due to the frequency domain correlation, the above-mentioned coefficients may be further compressed in frequency domain; on the other hand, the sparsity of time domain channel impulse responses allows time domain compression. Existing mainstream methods are frequency domain compression and time domain compression, and the two methods are equivalent in a sense. Spatial compression of Type II CSI is used to perform $W_3$ transformation for $W_{2,r}$, that is, $W_{2,r}W_3 = \overline{W_{2,r}}$, and obtain $W_{2,r} = \overline{W_{2,r}} W_3^H$ from orthogonality of $W_3$.

1. Time Domain Compression:

If $W_3$ is determined to be an M×M inverse discrete Fourier transform (Inverse Discrete Fourier Transform, IDFT) matrix, which is equivalent to transforming coefficients from frequency domain to time domain, that is, perform $(W_{2,r})_{2L \times M}(W_3)_{M \times M} = (\overline{W_{2,r}})_{2L \times M}$ transformation for $W_{2,r}$.

The precoding matrix at the $r^{th}$ layer in frequency domain is represented as:

$$(W_r)_{2N_1N_2 \times M} = (W_1)_{2N_1N_2 \times 2L}$$

If the spatially compressed frequency domain coefficients are sparse in time domain, only a small number of time domain coefficients with a large amplitude may be fed back, and the other time domain coefficients are zero. Because each column of $W_{2,r}$ is normalized, and one element in each column is 1, no feedback is necessary. Assuming that only the K time domain coefficients with the largest amplitude after IDFT transformation are fed back, the number of feedbacks required for each layer is reduced from (2L−1)M to (2L−1)K, and the indices of selected K non-zero time-domain coefficients are fed back to realize the time domain compression.

2. Frequency Domain Compression:

If selected K optimal orthogonal DFT vectors are included in $W_3$, $W_{2,r}$ may be approximately restored. For example, $W_3$ includes selected K orthogonal DFT vectors, K decomposed right principal singular vectors after singular value decomposition (Singular Value Decomposition, SVD), or the like. $(W_{2,r})_{2L \times M}(W_3)_{M \times K} = (\overline{W_{2,r}})_{2L \times K}$ transformation is performed for $W_{2,r}$.

The precoding matrix at the $r^{th}$ layer in frequency domain is represented as:

$$(W_r)_{2N_1N_2 \times M} = (W_1)_{2N_1N_2 \times 2L}$$

Therefore, content to be fed back is changed from 2L×M $W_{2,r}$ to 2L×K $\overline{W_{2,r}}$, and includes the indices of selected K orthogonal vectors. Because each column of $W_{2,r}$ is normalized, and each column has an element of 1, no feedback is required. In this way, the number of feedbacks required for each layer is reduced from (2L−1)M to (2L−1)K, so that frequency domain compression is realized.

3. Methods for Selecting a Compression Coefficient and an Index of Orthogonal Basis Vector:

A coefficient matrix form of the combination of M to-be-compressed frequency domain coefficients at the $r^{th}$ layer is:

$$(W_{2,r})_{2L \times M} = \begin{bmatrix} c_{1,r}^{(1)} & c_{1,r}^{(M)} \\ \vdots & \ldots & \vdots \\ c_{2L,r}^{(1)} & c_{2L,r}^{(M)} \end{bmatrix}$$

Time domain transformation is performed for each row of the above coefficient matrix or each row of the above coefficient matrix is multiplied by an orthogonal basis matrix, to transform the original to-be-compressed coefficient matrix into a matrix in time domain or a matrix in another transform domain. The transformed matrix is in the following form:

$$(\overline{W_{2,r}})_{2L \times M} = [\begin{smallmatrix} * \\ * \\ * \end{smallmatrix} \ldots \begin{smallmatrix} * \\ * \\ * \end{smallmatrix}]$$

At this time, there are two common methods for selecting K columns from 2L×M matrices:

(1) Selection for 2L Rows Together:

To be specific, for a transformed matrix, vectors with a length of M are finally obtained by adding up values per column or by using another method, from which the first K largest values are found. Positions of the K largest values in the columns of the transformed matrix constitute an index of an orthogonal basis vector, namely:

$$w_K=[k_1 \ldots k_K]$$

where, $k_K$ represents the index of the orthogonal basis vector, and K is an integer greater than zero.

In this way, it corresponds to a matrix of 2L×K that needs to be fed back for the transformed matrix, that is, $$(\overline{W_{2,r}})_{2L \times K} = [\begin{smallmatrix} \vdots \\ \vdots \end{smallmatrix} \ldots \begin{smallmatrix} \vdots \\ \vdots \end{smallmatrix}]$$

(2) Separate Selection for Each of 2L Rows:

The transformed matrix is a 2L×K matrix. The first K largest values are selected for each row, and column positions of the K largest values in the transformed matrix form the index of the orthogonal basis vector, that is, $$w_{k_1} = [k_{1,1} \quad k_{1,2} \quad \ldots \quad k_{1,K_1}]$$
$$w_{k_2} = [k_{2,1} \quad k_{1 2} \quad \ldots \quad k_{2,K_1}]$$
$$w_{k_3} = [k_{3,1} \quad k_{3,2} \quad \ldots \quad k_{3,K_3}]$$
$$\vdots$$
$$w_{k_{2L}} = [k_{2L,1} \quad k_{2L,2} \quad \ldots \quad k_{2L,K_{2L}}]$$

It should be understood that the number of indices of the orthogonal basis vectors selected in each row may be the same or different.

At this time, the terminal needs to feed back the selected coefficient matrix $(\overline{w_{2,r}})_{2L \times K}$ and index(es) of one or more orthogonal basis vectors.

The feedback coefficients and orthogonal basis vectors selected by using the methods in the related art result in the minimum feed overhead of being at least $\log_2(C_M^K)$. Especially, if the feedback coefficients and orthogonal basis vectors are separately selected for each of 2L rows, the feedback overhead is at least $\log_2((2L-1) \times C_M^K)$. If M is long enough, the overhead produced in a case that a to-be-fed-back orthogonal basis vector matrix is selected may be dozens of bits.

Technologies described in this specification are not limited to an LTE/LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems, for example, a $5^{th}$-generation (5G) mobile communications system and a later evolved communications system.

The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies.

The following describes the embodiments of this disclosure with reference to the accompanying drawings. A method for determining an index of an orthogonal basis vector provided in some embodiments of this disclosure can be applied to a wireless communications system. The wireless communications system may be a 5G system, or an evolved long term evolution (eLTE) system, or a later evolved communications system.

FIG. 1 is a schematic architectural diagram of a wireless communications system according to some embodiments of this disclosure. As shown in FIG. 1, the wireless communications system may include a network device 10 and a terminal. For example, the terminal is marked as UE 11. UE 11 may perform communication (signaling transmission or data transmission) with the network device 10. In practical applications, connection between the above devices may be a wireless connection. For ease of visually representing the connection relationship between the devices, a solid line is used to indicate that in FIG. 1.

It should be noted that the foregoing communications system may include a plurality of UEs 11, and that the network device 10 may communicate with the plurality of UEs 11.

The network device 10 provided in some embodiment of this disclosure may be a base station. The base station may be a commonly used base station or an evolved node base station (eNB), or may be a network device in a 5G system (for example, a next generation node base station (gNB) or a transmission and reception point (TRP)), or the like.

The terminal provided in some embodiment of this disclosure may be a mobile phone, a tablet computer, a notebook computer, an ultra-mobile personal computer (UMPC), a netbook, a personal digital assistant (PDA), or the like.

Figure 2:
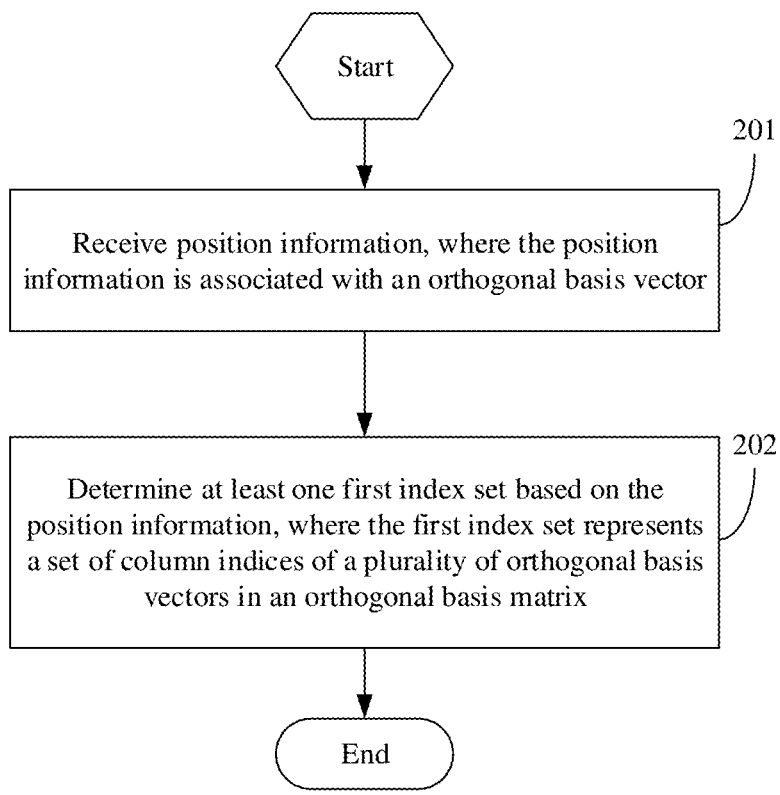
FIG. 2 is a first flowchart of a method for determining an index of an orthogonal basis vector according to some embodiments of this disclosure.

Referring to FIG. 2, an embodiment of this disclosure provides a method for determining an index of an orthogonal basis vector. The method may be performed by a network device, with specific steps as follows:

Step 201: Receive position information, where the position information is associated with an orthogonal basis vector.

Step 202: Determine at least one first index set based on the position information, where the first index set represents a set of column indices of a plurality of orthogonal basis vectors in an orthogonal basis matrix.

In an embodiment of this disclosure, optionally, the position information may include: at least one start index, where the start index is a start position index of a column of an orthogonal basis vector in the orthogonal basis matrix, X orthogonal basis vectors may be determined based on the start index, and X is an integer greater than zero; or the position information may include: at least one start index and at least one second index set, where the start index is a start position index of a column of an orthogonal basis vector in the orthogonal basis matrix, the second index set is a set of offset position indices of columns of a plurality of orthogonal basis vectors in the orthogonal basis matrix, X orthogonal basis vectors may be determined from d consecutive orthogonal basis vectors based on the start position index and the second index set, d and X are integers greater than zero, and d is greater than X.

It can be understood that, the specific number and form of the start index and the second index set are not limited in some embodiments of this disclosure.

In an embodiment of this disclosure, optionally, the first index set is associated with one or more of the start index, the second index set, an oversampling factor, an index of a layer, a row number index of a transform domain matrix, and an oversampling offset coefficient of the orthogonal basis vector. The oversampling offset coefficient of the orthogonal basis vector is greater than or equal to zero and less than the oversampling factor.

In an embodiment of this disclosure, optionally, one or more of the oversampling factor, the number of indices in the first index set, and the oversampling offset coefficient of the orthogonal basis vector are configured by a network side or defined by a protocol.

In an embodiment of this disclosure, optionally, the foregoing method may further include: performing modulo M with respect to the first index set (the first index set mod M) based on the position information to obtain modulo results, where M is the number of columns of the transform domain matrix.

In an embodiment of this disclosure, optionally, the foregoing method may further include: sorting the modulo results in ascending or descending order to match an order of selected transform domain matrices.

In some embodiments of this disclosure, optionally, the start index is represented as $I_{n,i}^r$, and the first index set is represented as $[I_{n,i+v}^r\ I_{n,i+O*1+v}^r\ \cdots\ I_{n,i+O*(X-1)+v}^r]$; and $I_{n,i}^r$ represents that an index of the $n^{th}$ row of the transform domain matrix at the $r^{th}$ layer is i; $I_{n,i+v}^r$ represents that an index of the $n^{th}$ row of the transform domain matrix at the $r^{th}$ layer is i+v; $I_{n,i+O*1+v}^r$ represents that an index of the $n^{th}$ row of the transform domain matrix at the $r^{th}$ layer is i+O*1+v; and $I_{n,i+O*(X-1)+v}^r$ represents that an index of the $n^{th}$ row of the transform domain matrix at the $r^{th}$ layer is i+O*(X-1)+v, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

In an embodiment of this disclosure, optionally, the performing modulo M with respect to the first index set based on the position information to obtain modulo results includes at least one of the following:

if the position index $I_{n,i}^r$ starts from 0, performing modulo M with respect to particular elements to obtain $[\tilde{I}_{n,i+v}^r\ \tilde{I}_{n,i+O*1+v}^r\ \cdots\ \tilde{I}_{n,i+O*(X-1)+v}^r]$, where the particular elements are indices in $[I_{n,i+v}^r\ I_{n,i+O*1+v}^r\ \cdots\ I_{n,i+O*(X-1)+v}^r]$ greater than (M−1) (that is, M minus 1);

if the position index $I_{n,i}^r$ starts from 0, performing modulo M with respect to $[I_{n,i+v}^r\ I_{n,i+O*1+v}^r\ \cdots\ I_{n,i+O*(X-1)+v}^r]$ to obtain $[\tilde{I}_{n,i+v}^r\ \tilde{I}_{n,i+O*1+v}^r\ \cdots\ \tilde{I}_{n,i+O*(X-1)+v}^r]$;

if the position index $I_{n,i}^r$ starts from 1, performing modulo (M+1) with respect to particular elements to obtain $[\tilde{I}_{n,i+v}^r\ \tilde{I}_{n,i+O*1+v}^r\ \cdots\ \tilde{I}_{n,i+O*(X-1)+v}^r]$, where the particular elements are indices in $[I_{n,i+v}^r\ I_{n,i+O*1+v}^r\ \cdots\ I_{n,i+O*(X-1)+v}^r]$ greater than M; and if the position index $I_{n,i}^r$ starts from 1, performing modulo (M+1) with respect to $[I_{n,i+v}^r\ I_{n,i+O*1+v}^r\ \cdots\ I_{n,i+O*(X-1)+v}^r]$ to obtain $[\tilde{I}_{n,i+v}^r\ \tilde{I}_{n,i+O*1+v}^r\ \cdots\ \tilde{I}_{n,i+O*(X-1)+v}^r]$; where $\tilde{I}_{n,i+v}^r$ represents that an index of the $n^{th}$ row of the transform domain matrix at the $r^{th}$ layer is (i+v) modulo M or (i+v) modulo (M+1); $\tilde{I}_{n,i+O*1+v}^r$ represents that an index of the $n^{th}$ row of the transform domain matrix at the $r^{th}$ layer is (i+O*1+v) modulo M or (i+O*1+v) modulo (M+1); and $\tilde{I}_{n,i+O*(X-1)+v}^r$ represents that an index of the $n^{th}$ row of the transform domain matrix at the $r^{th}$ layer is (i+O*(X-1)+v) modulo M or (i+O*(X-1)+v) modulo (M+1).

In another embodiment of this disclosure, optionally, the start index is represented as $I_{n,i}^r$, the second index set is represented as $[I_{n,i_0+v}^r\ I_{n,i_1+O*1+v}^r\ \cdots\ I_{n,i_{X-1}+O*(X-1)+v}^r]$, and the first index set is represented as $[I_{n,i_0+v+i}^r\ I_{n,i_1+O*1+v+i}^r\ \cdots\ I_{n,i_{X-1}+O*(X-1)+v+i}^r]$; and $I_{n,i}^r$ represents that an index of the $n^{th}$ row of the transform domain matrix at the $r^{th}$ layer is $I_{n,i_0+v}^r$ represents that an index of the $n^{th}$ row of the transform domain matrix at the $r^{th}$ layer is $i_0$+V; $I_{n,i_1+O*1+v}^r$ represents that an index of the $n^{th}$ row of the transform domain matrix at the $r^{th}$ layer is $i_1$+O*1+v; and $I_{n,i_{X-1}+O*(X-1)+v}^r$ represents that an index of the $n^{th}$ row of the transform domain matrix at the $r^{th}$ layer is $i_{X-1}$+O*(X-1)+v, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

It should be understood that values of $i_0, i_1 \ldots i_{X-1}$ may be equal. For $i_0, i_1 \ldots i_{X-1}$, X indices are selected from d consecutive indices starting from index i, where d is an integer greater than zero, and d is greater than X.

In another embodiment of this disclosure, optionally, the performing modulo M with respect to the first index set based on the position information to obtain modulo results includes at least one of the following:

if the position index $I_{n,i}^r$ starts from 0, performing modulo M with respect to particular elements to obtain $[\tilde{I}_{n,i_0+v+i}^r\ \tilde{I}_{n,i_1+O*1+v+i}^r\ \cdots\ \tilde{I}_{n,i_{X-1}+O*(X-1)+v+i}^r]$, where the particular elements are indices in $[I_{n,i_0+v+i}^r\ I_{n,i_1+O*1+v+i}^r\ \cdots\ I_{n,i_{X-1}+O*(X-1)+v+i}^r]$ greater than (M−1);

if the position index $I_{n,i}^r$ starts from 0, performing modulo M with respect to $[I_{n,i_0+v+i}^r\ I_{n,i_1+O*1+v+i}^r\ \cdots\ I_{n,i_{X-1}+O*(X-1)+v+i}^r]$ to obtain $[\tilde{I}_{n,i_0+v+i}^r\ \tilde{I}_{n,i_1+O*1+v+i}^r\ \cdots\ \tilde{I}_{n,i_{X-1}+O*(X-1)+v+i}^r]$;

if the position index $I_{n,i}^r$ starts from 1, performing modulo (M+1) with respect to particular elements to obtain $[\tilde{I}_{n,i_0+v+i}^r\ \tilde{I}_{n,i_1+O*1+v+i}^r\ \cdots\ \tilde{I}_{n,i_{X-1}+O*(X-1)+v+i}^r]$, where the particular elements are indices in $[I_{n,i_0+v+i}^r\ I_{n,i_1+O*1+v+i}^r\ \cdots\ I_{n,i_{X-1}+O*(X-1)+v+i}^r]$ greater than M; and if the position index $I_{n,i}^r$ starts from 1, performing modulo (M+1) with respect to $[I_{n,i_0+v+i}^r\ I_{n,i_1+O*1+v+i}^r\ \cdots\ I_{n,i_{X-1}+O*(X-1)+v+i}^r]$ to obtain $[\tilde{I}_{n,i_0+v+i}^r\ \tilde{I}_{n,i_1+O*1+v+i}^r\ \cdots\ \tilde{I}_{n,i_{X-1}+O*(X-1)+v+i}^r]$; where $\tilde{I}_{n,i_0+v+i}^r$ represents that an index of the $n^{th}$ row of the transform domain matrix at the $r^{th}$ layer is ($i_0$+v+i) modulo M or ($i_0$+v+i) modulo (M+1); $\tilde{I}_{n,i_1+O*1+v+i}^r$ represents that an index of the $n^{th}$ row of the transform domain matrix at the $r^{th}$ layer is ($i_1$+O*1+v+i) modulo M or ($i_1$+O*1+v+i) modulo (M+1); and $\tilde{I}_{n,i_{X-1}+O*(X-1)+v+i}^r$ represents that an index of the $n^{th}$ row of the transform domain matrix at the $r^{th}$ layer is ($i_{X-1}$+O*(X-1)+v+i) modulo M or ($i_{X-1}$+O*(X-1)+v+i) modulo (M+1).

In an embodiment of this disclosure, optionally, the determining a first index set based on the position information includes:

if the number of start indices is at least one and there is only one value for the row number index n of the transform domain matrix, selecting the first index set with respect to n rows together for each layer.

In another embodiment of this disclosure, optionally, the determining a first index set based on the position information includes at least one of the following:

if the number of start indices is at least two and a value of the row number index n of the transform domain matrix is equal to zero, selecting the first index set with respect to n rows together for each layer;

if the number of start indices is at least two and there are a plurality of values for the row number index n of the transform domain matrix, selecting the first index set with respect to n rows separately for each layer;

if the number of start indices is at least two, there is only one value r for the index of a layer, and there are a plurality of values for the row number index n of the transform domain matrix, selecting the first index set with respect to n rows separately for all layers; and if the number of start indices is at least two, an index value r of the corresponding layer is equal to zero, and there are a plurality of values for the row number index n of the transform domain matrix, selecting the first index set with respect to n rows separately for all layers.

In another embodiment of this disclosure, optionally, the determining a first index set based on the position information includes at least one of the following:

if the number of start indices is one, there is only one value r of the index of a layer, and there is only one value for the row number index n of the transform domain matrix, selecting the first index set with respect to n rows together for all layers; and if the number of start indices is one, and both an index value r of the corresponding layer and a value of the row number index n of the transform domain matrix are equal to zero, selecting the first index set with respect to n rows together for all layers.

In some embodiments of this disclosure, the set of column indices of the plurality of orthogonal basis vectors in the orthogonal basis matrix may be determined based on the received position information, which can reduce feedback overheads of the orthogonal basis vectors.

Figure 3:
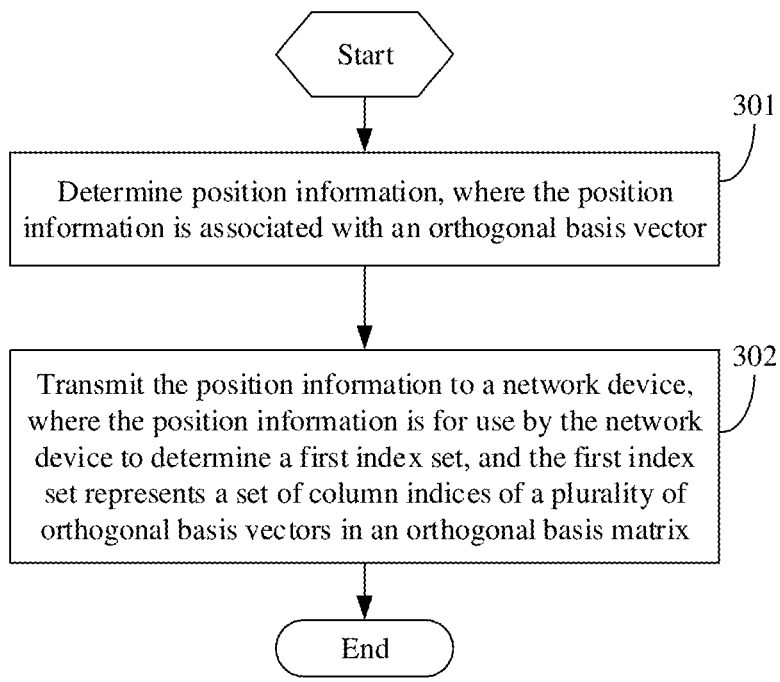
FIG. 3 is a second flowchart of a method for determining an index of an orthogonal basis vector according to some embodiments of this disclosure.

Referring to FIG. 3, some embodiments of this disclosure further provide a method for determining an index of an orthogonal basis vector. The method may be performed by a terminal, with specific steps as follows:

Step 301: Determine position information, where the position information is associated with an orthogonal basis vector.

In an embodiment of this disclosure, optionally, the determining position information includes: determining a plurality of transform domain matrices; obtaining a plurality of N×M transform domain value matrices based on the plurality of transform domain matrices, where N is the number of rows of the transform domain matrix, and M is the number of columns of the transform domain matrix; obtaining a sum matrix with a length of M based on the plurality of N×M transform domain value matrices; and determining the position information based on a position index of the greatest element in the sum matrix with a length of M.

For example, R N×M transform domain value matrices may be obtained based on R transform domain matrices, where N is the number of rows of a transform domain matrix, M is the number of columns of the transform domain matrix; and R is the total number of layers.

(1) Separate selection for each row of the transform domain for each layer:

In the N×M transform domain matrix at the $r^{th}$ layer, an N×M sum matrix at the $r^{th}$ layer is obtained.

(2) Selection for all rows in the transform domain together for each layer:

In the N×M transform domain matrix at the $r^{th}$ layer, a 1×M sum matrix at the $r^{th}$ layer is obtained.

(3) Separate selection for each row of the transform domain matrix for all layers:

In the R N×M transform domain matrices, an N×M sum matrix is obtained.

(4) Selection for all rows of the transform domain matrix together for all layers:

In the R N×M transform domain matrices, a 1×M sum matrix is obtained:

The position information is determined based on a maximum value of an index position element in the $n^{th}$ row of the sum matrix at the $r^{th}$ layer, or a maximum sum of X consecutive elements starting from the start position, or a maximum sum of d consecutive elements starting from the start position.

Step 302: Transmit the position information to a network device, where the position information is for use by the network device to determine a first index set, and the first index set represents a set of column indices of a plurality of orthogonal basis vectors in an orthogonal basis matrix.

In an embodiment of this disclosure, optionally, the position information may include: at least one start index, where the start index is a start position index of a column of an orthogonal basis vector in the orthogonal basis matrix, X orthogonal basis vectors may be determined based on the start index, and X is an integer greater than zero; or the position information may include: at least one start index and at least one second index set, where the start index is a start position index of a column of an orthogonal basis vector in the orthogonal basis matrix, the second index set is a set of offset position indices of columns of a plurality of orthogonal basis vectors in the orthogonal basis matrix, X orthogonal basis vectors may be determined from d consecutive orthogonal basis vectors based on the start position index and the second index set, d and X are integers greater than zero, and d is greater than X.

In an embodiment of this disclosure, optionally, the first index set is associated with one or more of the start index, the second index set, an oversampling factor, an index of a layer, a row number index of a transform domain matrix, and an oversampling offset coefficient of the orthogonal basis vector. The oversampling offset coefficient of the orthogonal basis vector is greater than or equal to zero and less than the oversampling factor.

In an embodiment of this disclosure, optionally, the method may further include: transmitting one or more of the oversampling factor, the number of indices in the first index set, and the oversampling offset coefficient of the orthogonal basis vector to the network device.

In another embodiment of this disclosure, optionally, the start index is represented as $I_{n,i}^r$, and the first index set is represented as $[I_{n,i+v}^r\ I_{n,i+O*1+v}^r \ldots I_{n,i+O*(X-1)+v}^r]$; and $I_{n,i}^r$ represents that an index of the $n^{th}$ row of the transform domain matrix at the $r^{th}$ layer is i; $I_{n,i+v}^r$ represents that an index of the $n^{th}$ row of the transform domain matrix at the $r^{th}$ layer is i+v; $I_{n,i+O*1+v}^r$ represents that an index of the $n^{th}$ row of the transform domain matrix at the $r^{th}$ layer is i+O*1+v; and $I_{n,i+O*(X-1)+v}^r$ represents that an index of the $n^{th}$ row of the transform domain matrix at the $r^{th}$ layer is i+O*(X-1)+v, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

In another embodiment of this disclosure, optionally, the start index is represented as $I_{n,i}^r$, the second index set is represented as $[I_{n,i_0+v}^r \; I_{n,i_1+O*1+v}^r \ldots I_{n,i_{X-1}+O*(X-1)+v}^r]$, and the first index set is represented as $[I_{n,i_0+v+i}^r \; I_{n,i_1+O*1+v+i}^r \ldots I_{n,i_{X-1}+O*(X-1)+v+i}^r]$; and $I_{n,i}^r$ represents that an index of the $n^{th}$ row of the transform domain matrix at the $r^{th}$ layer is i; $I_{n,i_0+v}^r$ represents that an index of the $n^{th}$ row of the transform domain matrix at the $r^{th}$ layer is $i_0+v$; $I_{n,i_1+O*1+v}^r$ represents that an index of the $n^{th}$ row of the transform domain matrix at the $r^{th}$ layer is $i_1+O*1+v$; and $I_{n,i_{X-1}+O*(X-1)+v}^r$ represents that an index of the $n^{th}$ row of the transform domain matrix at the $r^{th}$ layer is $i_{X-1}+O*(X-1)+v$, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

It should be understood that values of $i_0, i_1 \ldots i_{X-1}$ may be equal. For $i_0, i_1 \ldots i_{X-1}$, X indices are selected from d consecutive indices starting from index i, where d is an integer greater than zero, and d is greater than X.

In another embodiment of this disclosure, optionally, the foregoing method further includes: determining the first index set based on the position information, and sorting indices in the first index set in ascending or descending order; determining a corresponding feedback matrix based on the transform domain matrix and the sorted first index set; and transmitting the feedback matrix to the network device.

For example, for the feedback matrix at the $r^{th}$ layer, an element in the $n^{th}$ row and the $c^{th}$ column in the feedback matrix is an element in the $n^{th}$ row and the $x^{th}$ column of the transform domain matrix at the $r^{th}$ layer, where x is the $c^{th}$ element of the $n^{th}$ first index set at the $r^{th}$ layer.

For example, for the feedback matrix at the $r^{th}$ layer, elements in all rows and the $c^{th}$ column in the feedback matrix are elements in the $x^{th}$ column of the transform domain matrix at the $r^{th}$ layer, where x is the $c^{th}$ element of the first index set at the $r^{th}$ layer.

In some embodiments of this disclosure, the terminal may report the position information to the network device, so that the network device can determine the set of column indices of the plurality of orthogonal basis vectors in the orthogonal basis matrix based on the received position information, which can reduce feedback overheads of the orthogonal basis vectors.

The following describes the embodiments of this disclosure with reference to scenario 1 (selecting a plurality of consecutive orthogonal basis vectors) and scenario 2 (selecting a plurality of orthogonal basis vectors from a plurality of consecutive orthogonal basis vectors).

Scenario 1: Selecting X Consecutive Orthogonal Basis Vectors:

The terminal reports at least one start position $I_{n,i}^r$. Indices of the X orthogonal basis vectors selected by a network side for restoring a coefficient matrix are $[I_{n,i+v}^r \; I_{n,i+O*1+v}^r \ldots I_{n,i+O*(X-1)+v}^r]$, where O is an oversampling factor;
X is an integer greater than zero;
r is an index of a layer;

n is a row number index of the transform domain matrix; and v is an oversampling offset coefficient of the orthogonal basis vector.

In some embodiments of this disclosure, a value of O may be configured by the network side or defined by a protocol. It should be understood that in some embodiments of this disclosure, a value range of O and a determining manner of the specific value are not specifically limited.

In some embodiments of this disclosure, for the network side and the terminal, a value of v may be determined in the following manner:

(1) If the value of v is configured by a network or defined by a protocol, or may be obtained by the network side in other ways, the terminal does not need to feed back the value of v;

(2) If the value of v is selected by the terminal and may be obtained by the network side in other ways, the terminal does not need to feed back the value of v; and (3) If the value of v is selected by the terminal and cannot be obtained by the network side in other ways, the terminal needs to feed back the value of v.

It should be understood that in some embodiments of this disclosure, a value range of v and a determining manner of the specific value are not specifically limited.

In some embodiments of this disclosure, for the network side and the terminal, a value of X may be determined in the following manner:

(1) If the value of X is configured by a network or defined by a protocol, or may be obtained by the network side in other ways, the terminal does not need to feed back the value of X;

(2) If the value of X is selected by the terminal and may be obtained by the network side in other ways, the terminal does not need to feed back the value of X; and (3) If the value of X is selected by the terminal and cannot be obtained by the network side in other ways, the terminal needs to feed back the value of X.

In some embodiments of this disclosure, if the position index $I_{n,i}^r$ starts from 0, modulo M is performed with respect to indices satisfying $[I_{n,i+v}^r \; I_{n,i+O*1+v}^r \ldots I_{n,i+O*(X-1)+v}^r]$ >M−1, or modulo M is directly performed with respect to $[I_{n,i+v}^r \; I_{n,i+O*1+v}^r \ldots I_{n,i+O*(X-1)+v}^r]$ to obtain $[\tilde{I}_{n,i+v}^r \; \tilde{I}_{n,i+O*1+v}^r \ldots \tilde{I}_{n,i+O*(X-1)+v}^r]$.

If the position index $I_{n,i}^r$ starts from 1, modulo (M+1) is performed with respect to indices satisfying $[I_{n,i+v}^r \; I_{n,i+O*1+v}^r \ldots I_{n,i+O*(X-1)+v}^r]$>M, or modulo (M+1) is directly performed with respect to $[I_{n,i+v}^r \; I_{n,i+O*1+v}^r \ldots I_{n,i+O*(X-1)+v}^r]$, to obtain $[\tilde{I}_{n,i+v}^r \; \tilde{I}_{n,i+O*1+v}^r \ldots \tilde{I}_{n,i+O*(X-1)+v}^r]$.

M is the number of columns of the transform domain matrix.

The network side may sort $[\tilde{I}_{n,i+v}^r \; \tilde{I}_{n,i+O*1+v}^r \ldots \tilde{I}_{n,i+O*(X-1)+v}^r]$ in ascending or descending order after the modulo operation is completed, to match an order of the selected transform domain matrices.

If there is more than one $I_{n,i}^r$ fed back by the terminal, the network side may repeat the foregoing modulo steps or the modulo and sorting steps.

In some embodiments of this disclosure, the orthogonal basis index may be selected in the following ways:

(1) If there is more than one $I_{n,i}^r$ fed back by the terminal, and there is only one value for n or there is only n=0, it means that for each layer (the $r^{th}$ layer), orthogonal basis indices are selected with respect to n rows together;

(2) If there is more than one $I_{n,i}^r$ fed back by the terminal, and a value of n is not unique, it means that for each layer (the $r^{th}$ layer), an orthogonal basis index is selected separately with respect to each of n rows;

(3) If there is only one $I_{n,i}^r$ fed back by the terminal, and there is only one value for r and only one value for n, or there is only r=n=0, it means that for all layer (the $r^{th}$ layer), orthogonal basis indices are selected with respect to n rows together; and (4) If there is more than one $I_{n,i}^r$ fed back by the terminal, and there is only one value for r, or r=0 and a value of n is not unique, it means that for all layers (the $r^{th}$ layer), an orthogonal basis index is selected separately with respect to each of n rows.

Scenario 2: Selecting X Orthogonal Basis Vectors from d Consecutive Orthogonal Basis Vectors:

The terminal reports at least one start position $I_{n,i}^r$, and at least one group of index positions $[I_{n,i_0+v}^r \; I_{n,i_1+O*1+v}^r \cdots I_{n,i_{X-1}+O*(X-1)+v}^r]$. Indices of the orthogonal basis vectors selected by a network side for restoring a coefficient matrix are $[I_{n,i_0+v+i}^r \; I_{n,i_1+O*1+v+i}^r \cdots I_{n,i_{X-1}+O*(X-1)+v+i}^r]$, where O is an oversampling factor;

X is an integer greater than zero;

r is an index of a layer;

n is a row number index of the transform domain matrix; and v is an oversampling offset coefficient of the orthogonal basis vector.

In some embodiments of this disclosure, a value of O may be configured by the network side or defined by a protocol. It should be understood that in some embodiments of this disclosure, a value range of O and a determining manner of the specific value are not specifically limited.

In some embodiments of this disclosure, for the network side and the terminal, a value of v may be determined in the following manner:

(1) If the value of v is configured by a network or defined by a protocol, or may be obtained by the network side in other ways, the terminal does not need to feed back the value of v;

(2) If the value of v is selected by the terminal and may be obtained by the network side in other ways, the terminal does not need to feed back the value of v; and (3) If the value of v is selected by the terminal and cannot be obtained by the network side in other ways, the terminal needs to feed back the value of v.

It should be understood that in some embodiments of this disclosure, a value range of v and a determining manner of the specific value are not specifically limited.

In some embodiments of this disclosure, for the network side and the terminal, a value of X may be determined in the following manner:

(1) If the value of X is configured by a network or defined by a protocol, or may be obtained by the network side in other ways, the terminal does not need to feed back the value of X;

(2) If the value of X is selected by the terminal and may be obtained by the network side in other ways, the terminal does not need to feed back the value of X; and (3) If the value of X is selected by the terminal and cannot be obtained by the network side in other ways, the terminal needs to feed back the value of X.

It should be understood that in some embodiments of this disclosure, a value range of X and a determining manner of the specific value are not specifically limited.

It should be understood that values of $i_0, i_1 \ldots i_{X-1}$ may be equal. For $i_0, i_1 \ldots i_{X-1}$, X indices are selected from d consecutive indices starting from index i, where d is an integer greater than zero, and d is greater than X.

In some embodiments of this disclosure, for the network side and the terminal, a value of d may be determined in the following manner:

(1) If d is configured by a network or defined by a protocol, or may be obtained by the network side in other ways, the terminal does not need to feed back a value of d;

(2) If d is selected by the terminal and may be obtained by the network side in other ways, the terminal does not need to feed back a value of d; and (3) If d is selected by the terminal and cannot be obtained by the network side in other ways, the terminal needs to feed back a value of d.

In some embodiments of this disclosure, if the position index $I_{n,i}^r$ starts from 0, modulo M is performed with respect to indices satisfying $[I_{n,i_0+v+i}^r \; I_{n,i_1+O*1+v+i}^r \cdots I_{n,i_{X-1}+O*(X-1)+v+i}^r] > M-1$, or modulo M is directly performed with respect to $[I_{n,i_0+v+i}^r \; I_{n,i_1+O*1+v+i}^r \cdots I_{n,i_{X-1}+O*(X-1)+v+i}^r]$, to obtain $[\tilde{I}_{n,i_0+v+i}^r \; \tilde{I}_{n,i_1+O*1+v+i}^r \cdots \tilde{I}_{n,i_{X-1}+O*(X-1)+v+i}^r]$.

If the position index $I_{n,i}^r$ starts from 1, modulo (M+1) is performed with respect to indices satisfying $[I_{n,i_0+v+i}^r \; I_{n,i_1+O*1+v+i}^r \cdots I_{n,i_{X-1}+O*(X-1)+v+i}^r] > M$, or modulo (M+1) is directly performed with respect to $[I_{n,i_0+v+i}^r \; I_{n,i_1+O*1+v+i}^r \cdots I_{n,i_{X-1}+O*(X-1)+v+i}^r]$, to obtain $[\tilde{I}_{n,i_0+v+i}^r \; \tilde{I}_{n,i_1+O*1+v+i}^r \cdots \tilde{I}_{n,i_{X-1}+O*(X-1)+v+i}^r]$.

M is the number of columns of the transform domain matrix.

The network side may sort $[\tilde{I}_{n,i_0+v+i}^r \; \tilde{I}_{n,i_1+O*1+v+i}^r \cdots \tilde{I}_{n,i_{X-1}+O*(X-1)+v+i}^r]$ in ascending or descending order after the modulo operation is completed, to match an order of the selected transform domain matrices.

In some embodiments of this disclosure, the orthogonal basis index may be selected in the following ways:

(1) If there is more than one $I_{n,i}^r$ fed back by the terminal, and there is only one value for n or there is only n=0, it means that for each layer (the $r^{th}$ layer), orthogonal basis indices are selected with respect to n rows together;

(2) If there is more than one $I_{n,i}^r$ fed back by the terminal, and a value of n is not unique, it means that for each layer (the $r^{th}$ layer), an orthogonal basis index is selected separately with respect to each of n rows;

(3) If there is only one $I_{n,i}^r$ fed back by the terminal, and there is only one value for r and only one value for n, or there is only r=n=0, it means that for all layers (the $r^{th}$ layer), orthogonal basis indices are selected with respect to n rows together; and (4) If there is more than one $I_{n,i}^r$ fed back by the terminal, and there is only one value for r, or r=0 and a value of n is not unique, it means that for all layers (the $r^{th}$ layer), an orthogonal basis index is selected separately with respect to each of n rows.

Example 1

In Example 1, the following conditions are met: (1) Selection is performed separately for each layer; (2) an index of the orthogonal basis vector is selected for 2L rows of the transform domain matrix together; (3) an oversampling factor is O=1; and (4) an oversampling offset coefficient of an orthogonal basis vector is v=0.

Specific steps are as follows:

Step 1: Obtain a transform domain matrix (including a time domain matrix);

Step 2: Find the square sum of absolute values of all elements of the 2L×M transform domain matrix and then find the square root (Frobenius norm), directly calculate an amplitude of each element or execute other methods, and then obtain a transform domain value matrix with a length of 1×M by adding up values per column or by using other methods.

Step 3: Select X consecutive values at a position $I_{0,i}{}^r$ from the 1×M transform domain value matrix, and add up the X values or execute other methods to obtain the value $\tilde{A}_{0,i}{}^r$, and repeat this process in order from the start position to obtain a sum vector with a length of M, that is, $[\tilde{A}_{0,1}{}^r \ldots \tilde{A}_{0,M}{}^r]$.

Step 4: Find the greatest element in the sum vector $[\tilde{A}_{0,1}{}^r \ldots \tilde{A}_{0,M}{}^r]$, where a position index $I_{0,i}{}^r$ of the element is the value that the terminal needs to feed back.

Step 5: Sort the index vector $[I_{0,i}{}^r I_{0,i+1}{}^r \ldots I_{0,i+X+1}{}^r]$ in ascending order to obtain a new index vector, so that the terminal finds a corresponding feedback matrix based on the new index vector.

Step 6: The terminal feeds back the feedback matrix.

Step 7: For indices $[I_{0,i}{}^r I_{0,i+1}{}^r \ldots I_{0,i+X-1}{}^r]$ of the orthogonal basis vectors selected by a network side for restoring a coefficient matrix, if the position index $\tilde{I}_{0,i}{}^r$ of $\tilde{A}_{0,i}{}^r$ starts from 0, perform modulo M with respect to indices satisfying $[I_{0,i}{}^r I_{0,i+1}{}^r \ldots I_{0,i+X-1}{}^r] > M-1$ or directly perform modulo M with respect to the entire vector $[I_{0,i}{}^r I_{0,i+1}{}^r \ldots I_{0,i+X-1}{}^r]$, to obtain the index vector $[\tilde{I}_{0,i}{}^r \tilde{I}_{0,i+1}{}^r \ldots \tilde{I}_{0,i+X+1}{}^r]$; and if the position index $\tilde{I}_{0,i}{}^r$ of $\tilde{A}_{0,i}{}^r$ starts from 1, perform modulo (M+1) with respect to indices satisfying $[I_{0,i}{}^r I_{0,i+1}{}^r \ldots I_{0,i+X-1}{}^r] > M$ or directly perform modulo (M+1) with respect to the entire vector $[I_{0,i}{}^r I_{0,i+1}{}^r \ldots I_{0,i+X-1}{}^r]$, to obtain the index vector $[\tilde{I}_{0,i}{}^r \tilde{I}_{0,i+1}{}^r \ldots \tilde{I}_{0,i+X+1}{}^r]$.

Step 8: The network side sorts elements of the index vector $[\tilde{I}_{0,i}{}^r \tilde{I}_{0,i+1}{}^r \ldots \tilde{I}_{0,i+X+1}{}^r]$.

In some embodiments of this disclosure, for the network side and the terminal, a value of X may be determined in the following manner:

(1) If the value of X is configured by a network or defined by a protocol, or may be obtained by the network side in other ways, the terminal does not need to feed back the value of X;

(2) If the value of X is selected by the terminal and may be obtained by the network side in other ways, the terminal does not need to feed back the value of X; and (3) If the value of X is selected by the terminal and cannot be obtained by the network side in other ways, the terminal needs to feed back the value of X.

It should be understood that in some embodiments of this disclosure, a value range of X and a determining manner of the specific value are not specifically limited.

Example 2

In Example 2, the following conditions are met: (1) Selection is performed separately for each layer; (2) an index of the orthogonal basis vector is selected separately with respect to each of 2L rows of the transform domain matrix; (3) an oversampling factor is O=1; and (4) an oversampling offset coefficient of an orthogonal basis vector is v=0.

Specific steps are as follows:

Step 1: Obtain a transform domain matrix (including a time domain matrix).

Step 2: Find the square sum of absolute values of all elements of the 2L×M transform domain matrix and then find the square root (Frobenius norm), directly calculate an amplitude of each element or execute other methods, and then obtain a transform domain value matrix with a length of 2L×M.

Step 3: Select X consecutive values at a position $I_{n,i}{}^r$ of the $n^{th}$ row from a 2L×M transform domain value matrix, and add up the X values or execute other methods to obtain the value $\tilde{A}_{n,i}{}^r$, and repeat this process in order from the start position to obtain a sum vector with a length of M, that is, $[\tilde{A}_{n,1}{}^r \ldots \tilde{A}_{n,M}{}^r]$. There are 2L sum vectors with a length of M, that is, a length of n is 2L.

Step 4: Find the greatest element in the sum vector $[\tilde{A}_{n,1}{}^r \ldots \tilde{A}_{n,M}{}^r]$, where a position index $I_{n,i}{}^r$ of the element is the value in the $n^{th}$ row that the terminal needs to feed back.

Step 5: Sort the index vector $[\tilde{I}_{0,i}{}^r \tilde{I}_{0,i+1}{}^r \ldots \tilde{I}_{0,i+X+1}{}^r]$ in ascending order to obtain a new index vector, so that the terminal finds a corresponding feedback matrix based on the new index vector.

Step 6: The terminal feeds back the feedback matrix.

Step 7: For indices $[I_{n,i}{}^r I_{n,i+1}{}^r \ldots I_{n,i+X+1}{}^r]$ of the orthogonal basis vectors selected by a network side for restoring a coefficient matrix, if the position index $\tilde{I}_{0,i}{}^r$ of $\tilde{A}_{n,i}{}^r$ starts from 0, perform modulo M with respect to indices satisfying $[I_{n,i}{}^r I_{n,i+1}{}^r \ldots I_{n,i+X-1}{}^r] > M-1$ or directly perform modulo M with respect to the entire vector $[I_{n,i}{}^r I_{n,i+1}{}^r \ldots I_{n,i+X-1}{}^r]$, to obtain the index vector $[\tilde{I}_{n,i}{}^r \tilde{I}_{n,i+1}{}^r \ldots \tilde{I}_{n,i+X+1}{}^r]$; and if the position index $\tilde{I}_{0,i}{}^r$ of $\tilde{A}_{n,i}{}^r$ starts from 0, perform modulo (M+1) with respect to indices satisfying $[I_{n,i}{}^r I_{n,i+1}{}^r \ldots I_{n,i+X-1}{}^r] > M$ or directly perform modulo (M+1) with respect to the entire vector $[I_{n,i}{}^r I_{n,i+1}{}^r \ldots I_{n,i+X-1}{}^r]$, to obtain the index vector $[\tilde{I}_{n,i}{}^r \tilde{I}_{n,i+1}{}^r \ldots \tilde{I}_{n,i+X+1}{}^r]$.

Step 8: The network side sorts elements of the index vector $[\tilde{I}_{0,i}{}^r \tilde{I}_{0,i+1}{}^r \ldots \tilde{I}_{0,i+X+1}{}^r]$.

In some embodiments of this disclosure, for the network side and the terminal, a value of X may be determined in the following manner:

(1) If the value of X is configured by a network or defined by a protocol, or may be obtained by the network side in other ways, the terminal does not need to feed back the value of X;

(2) If the value of X is selected by the terminal and may be obtained by the network side in other ways, the terminal does not need to feed back the value of X; and (3) If the value of X is selected by the terminal and cannot be obtained by the network side in other ways, the terminal needs to feed back the value of X.

It should be understood that in some embodiments of this disclosure, a value range of X and a determining manner of the specific value are not specifically limited.

In some embodiments of this disclosure, a network device is further provided. Because a problem resolving principle of the network device is similar to the method for determining an index of an orthogonal basis vector in some embodiments of this disclosure, for the implementation of the network device, reference may be made to the implementation of the method, and details are not repeated.

Figure 4:
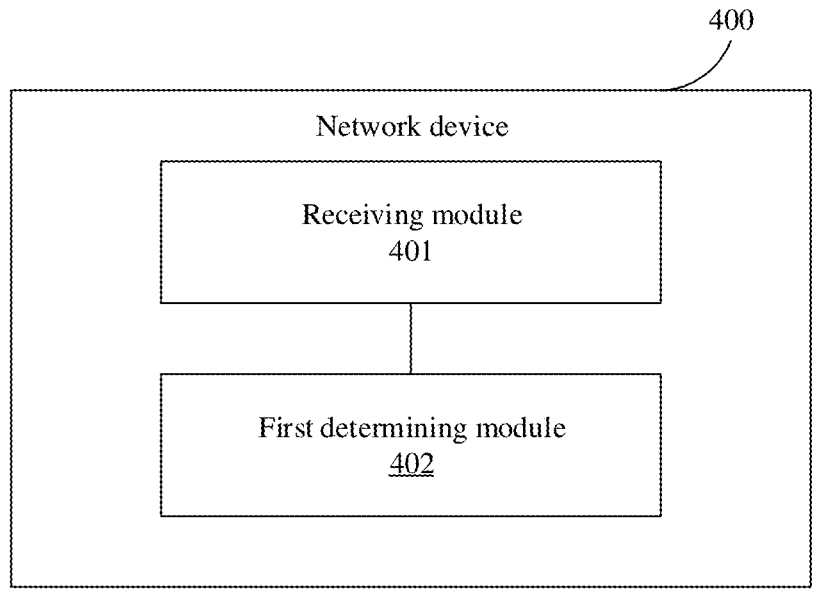
FIG. 4 is a first schematic structural diagram of a network device according to some embodiments of this disclosure.

Referring to FIG. 4, some embodiments of this disclosure further provide a network device, where the network device 400 includes:

a receiving module 401, configured to receive position information, where the position information is associated with an orthogonal basis vector; and a first determining module 402, configured to determine at least one first index set based on the position information, where the first index set represents a set of column indices of a plurality of orthogonal basis vectors in an orthogonal basis matrix.

In an embodiment of this disclosure, optionally, the position information may include: at least one start index, where the start index is a start position index of a column of an orthogonal basis vector in the orthogonal basis matrix; or the position information includes at least one start index and at least one second index set, where the start index is a start position index of a column of an orthogonal basis vector in the orthogonal basis matrix, and the second index set is a set of offset position indices of a plurality of orthogonal basis vectors in columns of the orthogonal basis matrix relative to the start index.

It can be understood that, the specific number of the start index and the second index set are not limited in some embodiments of this disclosure.

In an embodiment of this disclosure, optionally, the first index set is associated with one or more of the start index, the second index set, an oversampling factor, an index of a layer, a row number index of a transform domain matrix, and an oversampling offset coefficient of the orthogonal basis vector, where
the oversampling offset coefficient of the orthogonal basis vector is greater than or equal to zero and less than the oversampling factor.

In an embodiment of this disclosure, optionally, one or more of the oversampling factor, the number of indices in the first index set, and the oversampling offset coefficient of the orthogonal basis vector may be configured by the network side or defined by a protocol.

In an embodiment of this disclosure, optionally, the network device 400 may further include a modulo module, configured to perform modulo M with respect to the first index set based on the position information to obtain modulo results, where M is the number of columns of the transform domain matrix.

In an embodiment of this disclosure, optionally, the network device 400 may further include a sorting module, configured to sort the modulo results in ascending or descending order to match an order of selected transform domain matrices.

In some embodiments of this disclosure, optionally, the start index is represented as $I_{n,i}^r$, and the first index set is represented as $[I_{n,i+v}^r \; I_{n,i+O*1+v}^r \; \cdots \; I_{n,i+O*(X-1)+v}^r]$; and $I_{n,i}^r$ represents that an index of the $n^{th}$ row of the transform domain matrix at the $r^{th}$ layer is i; $I_{n,i+O*1+v}^r$ represents that an index of the $n^{th}$ row of the transform domain matrix at the $r^{th}$ layer is i+v; $I_{n,i+O*1+v}^r$ represents that an index of the $n^{th}$ row of the transform domain matrix at the $r^{th}$ layer is i+O*1+v; and $I_{n,i+O*(X-1)+v}^r$ represents that an index of the $n^{th}$ row of the transform domain matrix at the $r^{th}$ layer is i+O*(X-1)+v, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

In an embodiment of this disclosure, optionally, the modulo module further executes at least one of the following:

if the position index $I_{n,i}^r$ starts from 0, performing modulo M with respect to particular elements to obtain $[\tilde{I}_{n,i+v}^r \; \tilde{I}_{n,i+O*1+v}^r \; \cdots \; \tilde{I}_{n,i+O*(X-1)+v}^r]$, where the particular elements are indices in $[I_{n,i+v}^r \; I_{n,i+O*1+v}^r \; \cdots \; I_{n,i+O*(X-1)+v}^r]$ greater than (M−1);

if the position index $I_{n,i}^r$ starts from 0, performing modulo M with respect to $[I_{n,i+v}^r \; I_{n,i+O*1+v}^r \; \cdots \; I_{n,i+O*(X-1)+v}^r]$ to obtain $[\tilde{I}_{n,i+v}^r \; \tilde{I}_{n,i+O*1+v}^r \; \cdots \; \tilde{I}_{n,i+O*(X-1)+v}^r]$;

if the position index $I_{n,i}^r$ starts from 1, performing modulo (M+1) with respect to particular elements to obtain $[\tilde{I}_{n,i+v}^r \; \tilde{I}_{n,i+O*1+v}^r \; \cdots \; \tilde{I}_{n,i+O*(X-1)+v}^r]$, where the particular elements are indices in $[I_{n,i+v}^r \; I_{n,i+O*1+v}^r \; \cdots \; I_{n,i+O*(X-1)+v}^r]$ greater than M; and if the position index $I_{n,i}^r$ starts from 1, performing modulo (M+1) with respect to $[I_{n,i+v}^r \; I_{n,i+O*1+v}^r \; \cdots \; I_{n,i+O*(X-1)+v}^r]$ to obtain $[\tilde{I}_{n,i+v}^r \; \tilde{I}_{n,i+O*1+v}^r \; \cdots \; \tilde{I}_{n,i+O*(X-1)+v}^r]$ where $\tilde{I}_{n,i+v}^r$ represents that an index of the $n^{th}$ row of the transform domain matrix at the $r^{th}$ layer is mod (i+v, modulus); $\tilde{I}_{n,i+O*1+v}^r$ represents that an index of the $n^{th}$ row of the transform domain matrix at the $r^{th}$ layer is mod (i+O*1+v, modulus); $\tilde{I}_{n,i+O*(X-1)+v}^r$ represents that an index of the $n^{th}$ row of the transform domain matrix at the $r^{th}$ layer is mod (i+O*(X-1)+v, modulus), and the modulus is M+1 or M.

It should be understood that mod (a, b) is a mod b.

In another embodiment of this disclosure, optionally, the start index is represented as $I_{n,i}^r$, the second index set is represented as $[I_{n,i_0+v}^r \; I_{n,i_1+O*1+v}^r \; \cdots \; I_{n,i_{X-1}+O*(X-1)+v}^r]$, and the first index set is represented as $[I_{n,i_0+v+i}^r \; I_{n,i_1+O*1+v+i}^r \; \cdots \; I_{n,i_{X-1}+O*(X-1)+v+i}^r]$;

$I_{n,i}^r$ represents that an index of the $n^{th}$ row of the transform domain matrix at the $r^{th}$ layer is i; $I_{n,i_0+v}^r$ represents that an index of the $n^{th}$ row of the transform domain matrix at the $r^{th}$ layer is $i_0$+v; $I_{n,i_1+O*1+v}^r$ represents that an index of the $n^{th}$ row of the transform domain matrix at the $r^{th}$ layer is $i_1$+O*1+v; and $I_{n,i_{X-1}+O*(X-1)+v}^r$ represents that an index of the $n^{th}$ row of the transform domain matrix at the $r^{th}$ layer is $i_{X-1}$+O*(X-1)+v, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

It should be understood that values of $i_0, i_1 \ldots i_{X-1}$ may be equal. For $i_0, i_1 \ldots i_{X-1}$, X indices are selected from d consecutive indices starting from index i, where d is an integer greater than zero, and d is greater than X.

In another embodiment of this disclosure, optionally, the modulo module further executes at least one of the following:

if the position index $I_{n,i}^r$ starts from 0, performing modulo M with respect to particular elements to obtain $[\tilde{I}_{n,i_0+v+i}^r \; \tilde{I}_{n,i_1+O*1+v+i}^r \; \cdots \; \tilde{I}_{n,i_{X-1}+O*(X-1)+v+i}^r]$, where the particular elements are indices in $[I_{n,i_0+v+i}^r \; I_{n,i_1+O*1+v+i}^r \; \cdots \; I_{n,i_{X-1}+O*(X-1)+v+i}^r]$ greater than (M−1);

if the position index $I_{n,i}^r$ starts from 0, performing modulo M with respect to $[I_{n,i_0+v+i}^r \; I_{n,i_1+O*1+v+i}^r \; \cdots \; I_{n,i_{X-1}+O*(X-1)+v+i}^r]$ to obtain $[\tilde{I}_{n,i_0+v+i}^r \; \tilde{I}_{n,i_1+O*1+v+i}^r \; \cdots \; \tilde{I}_{n,i_{X-1}+O*(X-1)+v+i}^r]$;

if the position index $I_{n,i}^r$ starts from 1, performing modulo (M+1) with respect to particular elements to obtain $[\tilde{I}_{n,i_0+v+i}^r \; \tilde{I}_{n,i_1+O*1+v+i}^r \; \cdots \; \tilde{I}_{n,i_{X-1}+O*(X-1)+v+i}^r]$, where the particular elements are indices in $[I_{n,i_0+v+i}^r \; I_{n,i_1+O*1+v+i}^r \; \cdots \; I_{n,i_{X-1}+O*(X-1)+v+i}^r]$ greater than M; and if the position index $I_{n,i}^r$ starts from 1, performing modulo (M+1) with respect to $[I_{n,i_0+v+i}^r \; I_{n,i_1+O*1+v+i}^r \; \cdots \; I_{n,i_{X-1}+O*(X-1)+v+i}^r]$ to obtain $[\tilde{I}_{n,i_0+v+i}^r \; \tilde{I}_{n,i_1+O*1+v+i}^r \; \cdots \; \tilde{I}_{n,i_{X-1}+O*(X-1)+v+i}^r]$; where $\tilde{I}_{n,i_0+v+i}^r$ represents that an index of the $n^{th}$ row of the transform domain matrix at the $r^{th}$ layer is mod ($i_0$+v+i, modulus); $\tilde{I}_{n,i_1+O*1+v+i}^r$ represents that an index of the $n^{th}$ row of the transform domain matrix at the $r^{th}$ layer is mod ($i_1$+O*1+v+i, modulus); $\tilde{I}_{n,i_{X-1}+O*(X-1)+v+i}^r$ represents that an index of the $n^{th}$ row of the transform domain matrix at the $r^{th}$ layer is mod ($i_{X-1}$+O*(X-1)+v+i, modulus), and the modulus is M+1 or M.

It should be understood that mod (a, b) is a mod b, or a mod b.

In an embodiment of this disclosure, optionally, the first determining module 402 is further configured to:

if the number of start indices is at least one and there is only one value for the row number index n of the transform domain matrix, select the first index set with respect to n rows together for each layer.

In another embodiment of this disclosure, optionally, the first determining module 402 is further configured to execute at least one of the following:

if the number of start indices is at least two and a value of the row number index n of the transform domain matrix is equal to zero, selecting the first index set with respect to n rows together for each layer;

if the number of start indices is at least two and there are a plurality of values for the row number index n of the transform domain matrix, selecting the first index set with respect to n rows separately for each layer;

if the number of start indices is at least two, there is only one value r for the index of a layer, and there are a plurality of values for the row number index n of the transform domain matrix, selecting the first index set with respect to n rows separately for all layers; and if the number of start indices is at least two, an index value r of the corresponding layer is equal to zero, and there are a plurality of values for the row number index n of the transform domain matrix, selecting the first index set with respect to n rows separately for all layers.

In yet another embodiment of this disclosure, optionally, the first determining module 402 is further configured to:

if the number of start indices is one, there is only one value r of the index of a layer, and there is only one value for the row number index n of the transform domain matrix, select the first index set with respect to n rows together for all layers; and if the number of start indices is one, and both an index value r of the corresponding layer and a value of the row number index n of the transform domain matrix are equal to zero, select the first index set with respect to n rows together for all layers.

The network device provided according to some embodiments of this disclosure may execute the above method embodiment, with a similar implementation principle and similar technical effects. Details are not repeated herein in this embodiment.

Some embodiments of this disclosure further provide a terminal. Because a problem resolving principle of the terminal is similar to the method for determining an index of an orthogonal basis vector in some embodiments of this disclosure, for implementation of the terminal, reference may be made to implementation of the method, and details are not described herein again.

Figure 5:
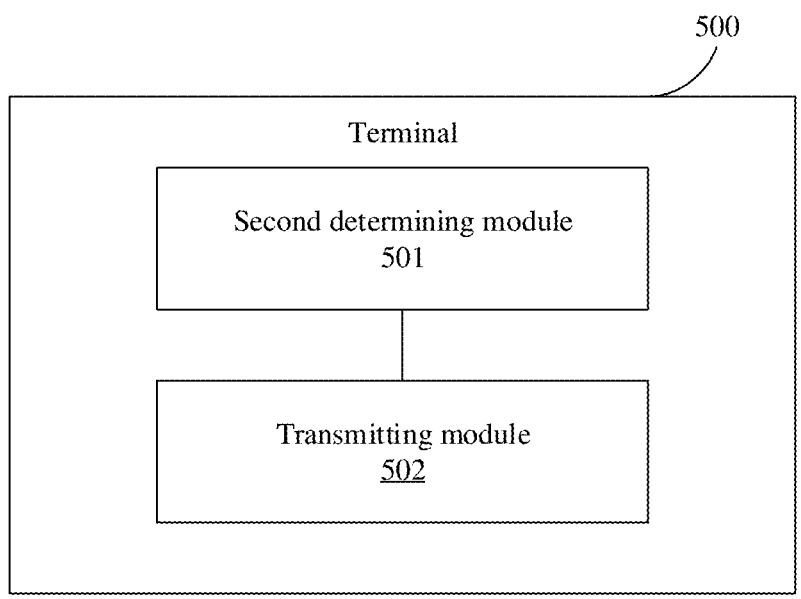
FIG. 5 is a first schematic structural diagram of a terminal according to some embodiments of this disclosure.

Referring to FIG. 5, some embodiments of this disclosure further provide a terminal, and the terminal 500 includes:

a second determining module 501, configured to determine position information, where the position information is associated with an orthogonal basis vector; and a transmitting module 502, configured to transmit the position information to a network device, where the position information is for use by the network device to determine at least one first index set, and the first index set represents a set of column indices of a plurality of orthogonal basis vectors in an orthogonal basis matrix.

In an embodiment of this disclosure, optionally, the second determining module 501 is further configured to: determine a plurality of transform domain matrices; obtain a plurality of N×M transform domain value matrices based on the plurality of transform domain matrices, where N is the number of rows of the transform domain matrix, and M is the number of columns of the transform domain matrix; obtain a sum matrix with a length of M based on the plurality of N×M transform domain value matrices; and determine the position information based on a position index of the greatest element in the sum matrix with a length of M.

In an embodiment of this disclosure, optionally, the position information may include: at least one start index, where the start index is a start position index of a column of an orthogonal basis vector in the orthogonal basis matrix, X orthogonal basis vectors may be determined based on the start index, and X is an integer greater than zero; or the position information may include: at least one start index and at least one second index set, where the start index is a start position index of a column of an orthogonal basis vector in the orthogonal basis matrix, the second index set is a set of offset position indices of columns of a plurality of orthogonal basis vectors in the orthogonal basis matrix, X orthogonal basis vectors may be determined from d consecutive orthogonal basis vectors based on the start position index and the second index set, d and X are integers greater than zero, and d is greater than X.

In an embodiment of this disclosure, optionally, the first index set is associated with one or more of the start index, the second index set, an oversampling factor, an index of a layer, a row number index of a transform domain matrix, and an oversampling offset coefficient of the orthogonal basis vector. The oversampling offset coefficient of the orthogonal basis vector is greater than or equal to zero and less than the oversampling factor.

In an embodiment of this disclosure, optionally, the transmitting module 502 is further configured to: transmit one or more of the oversampling factor, the number of indices in the first index set, and the oversampling offset coefficient of the orthogonal basis vector to the network device.

In an embodiment of this disclosure, optionally, the start index is represented as $I_{n,i}^r$, and the first index set is represented as $[I_{n,i+v}^r \ I_{n,i+O*1+v}^r \ \ldots \ I_{n,i+O*(X-1)+v}^r]$;

$I_{n,i}^r$ represents that an index of the $n^{th}$ row of the transform domain matrix at the $r^{th}$ layer is i; $I_{n,i+v}^r$ represents that an index of the $n^{th}$ row of the transform domain matrix at the $r^{th}$ layer is i+v; $I_{n,i+O*1+v}^r$ represents that an index of the $n^{th}$ row of the transform domain matrix at the $r^{th}$ layer is i+O*1+v; and $I_{n,i+O*(X-1)+v}^r$ represents that an index of the $n^{th}$ row of the transform domain matrix at the $r^{th}$ layer is i+O*(X−1)+v, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

In another embodiment of this disclosure, optionally, the start index is represented as $I_{n,i}^r$, the second index set is represented as $[I_{n,i_0+v}^r \ I_{n,i_1+O*1+v}^r \ \ldots \ I_{n,i_{X-1}+O*(X-1)+v}^r]$, and the first index set is represented as $[I_{n,i_0+v+i}^r \ I_{n,i_1+O*1+v+i}^r \ \ldots \ I_{n,i_{X-1}+O*(X-1)+v+i}^r]$; and $I_{n,i}^r$ represents that an index of the $n^{th}$ row of the transform domain matrix at the $r^{th}$ layer is i; $I_{n,i_0+v}^r$ represents that an index of the $n^{th}$ row of the transform domain matrix at the $r^{th}$ layer is $i_0$+v; $I_{n,i_1+O*1+v}^r$ represents that an index of the $n^{th}$ row of the transform domain matrix at the $r^{th}$ layer is $i_1+O*1+v$; and $I_{n,i_{X-1}+O*(X-1)+v}^r$ represents that an index of the $n^{th}$ row of the transform domain matrix at the $r^{th}$ layer is $i_{X-1}+O*(X-1)+v$, where O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

It should be understood that values of $i_0, i_1 \ldots i_{X-1}$ may be equal. For $i_0, i_1 \ldots i_{X-1}$, X indices are selected from d consecutive indices starting from index i, where d is an integer greater than zero, and d is greater than X.

In another embodiment of this disclosure, optionally, the terminal further includes a third determining module, configured to: determine the first index set based on the position information, and sort indices in the first index set in ascending or descending order; determine a corresponding feedback matrix based on the transform domain matrix and the sorted first index set; and transmit the feedback matrix to the network device.

The terminal provided in some embodiments of this disclosure may execute the foregoing method embodiments, implementation principles and technical effects thereof are similar, and details are not described herein again in this embodiment.

Figure 6:
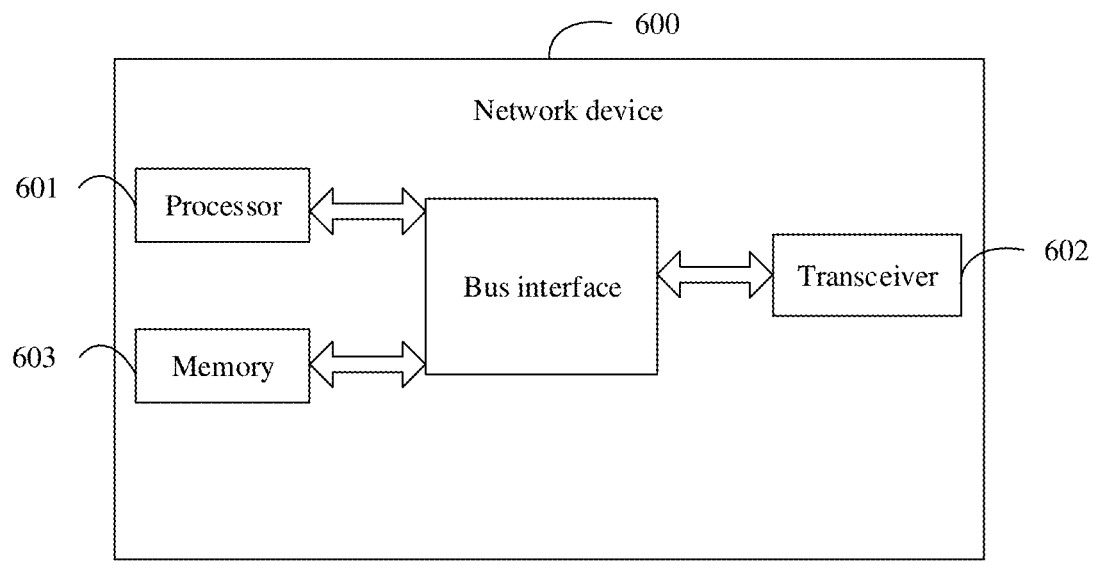
FIG. 6 is a second schematic structural diagram of a network device according to some embodiments of this disclosure.

FIG. 6 is a structural diagram of a network device applied to some embodiments of this disclosure. As shown in FIG. 6, the network device 600 includes a processor 601, a transceiver 602, a memory 603, and a bus interface.

In an embodiment of this disclosure, the network device 600 further includes a program stored in the memory 603 and capable of running on the processor 601, where when the program is executed by the processor 601, the following step is implemented: receiving position information, where the position information is associated with an orthogonal basis vector; and determining at least one first index set based on the position information, where the first index set represents a set of column indices of a plurality of orthogonal basis vectors in an orthogonal basis matrix.

In FIG. 6, a bus architecture may include any quantity of interconnected buses and bridges, and specifically connect together various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface provides interfaces. The transceiver 602 may be a plurality of components, including a transmitter and a receiver, and provides units for communicating with a variety of other apparatuses on a transmission medium.

The processor 601 is responsible for management of the bus architecture and general processing, and the memory 603 may store data for use by the processor 601 when the processor 601 performs an operation.

The network device provided according to some embodiments of this disclosure may execute the above method embodiment, with a similar implementation principle and similar technical effects. Details are not repeated herein in this embodiment.

Figure 7:
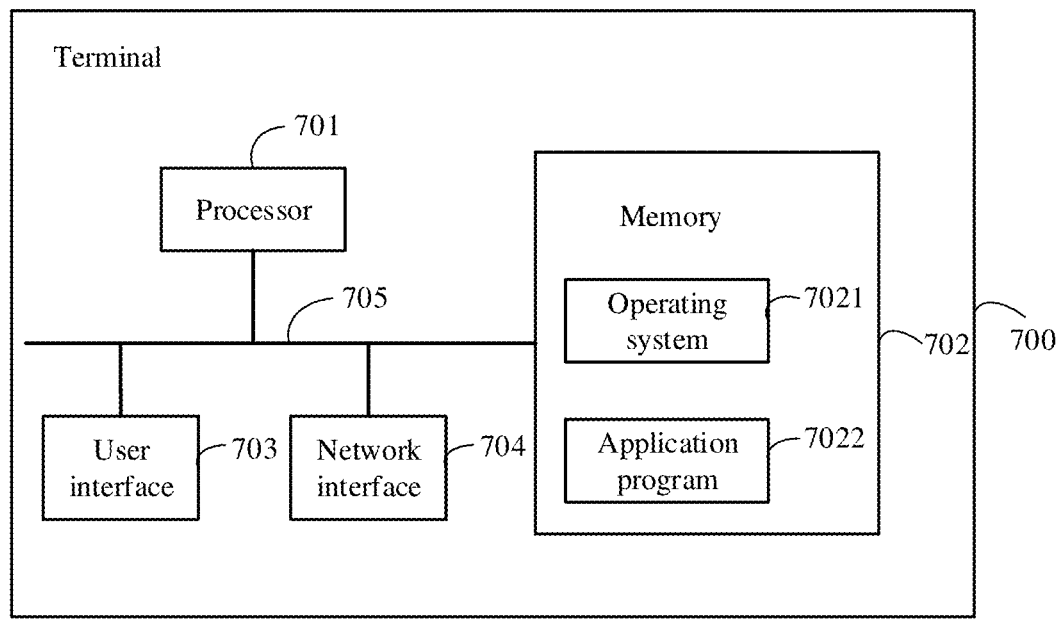
FIG. 7 is a second schematic structural diagram of a terminal according to some embodiments of this disclosure.

As shown in FIG. 7, a terminal 700 includes at least one processor 701, a memory 702, at least one network interface 704, and a user interface 703. Components of the terminal 700 are coupled together by using a bus system 705. It can be understood that the bus system 705 is configured to implement connection and communication between these components. In addition to a data bus, the bus system 705 further includes a power bus, a control bus, and a status signal bus. However, for clarity of description, various buses are marked as the bus system 705 in FIG. 7.

The user interface 703 may include a display, a keyboard, or a pointing device (for example, a mouse, a trackball, a touch panel, or a touchscreen).

It may be understood that the memory 702 in some embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 702 of the system and the method described in some embodiments of this disclosure is intended to include but not be limited to these and any other applicable types of memories.

In some embodiments, the memory 702 stores the following elements: executable modules or data structures, or a subset thereof, or an extended set thereof: an operating system 7021 and an application program 7022.

The operating system 7021 includes various system programs, such as a framework layer, a core library layer, and a driver layer, for implementing various basic services and processing hardware-based tasks. The application program 7022 includes various application programs, such as a media player and a browser, which are used to implement various application services. A program for implementing the method in some embodiments of this disclosure may be included in the application program 7022.

In one embodiment of this disclosure, the program or instruction stored in the memory 702, specifically, the program or instruction stored in the application program 7022, is invoked to perform the steps of determining position information related to an orthogonal basis vector; transmitting the position information to a network device, where the position information is for use by the network device to determine at least one first index set, and the first index set represents a set of column indices of a plurality of orthogonal basis vectors in an orthogonal basis matrix.

The terminal provided in some embodiments of this disclosure may execute the foregoing method embodiments, implementation principles and technical effects thereof are similar, and details are not described herein again in this embodiment.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, enabling the processor to read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

A person skilled in the art should understand that some embodiments of this disclosure may be provided as a method, a system, or a computer program product. Therefore, some embodiments of this disclosure may be hardware-only embodiments, software-only embodiments, or embodiments with a combination of software and hardware. Moreover, some embodiments of this disclosure may be implemented in the form of one or more computer program products implemented on a computer-usable storage medium (including but not limited to a disk memory, a CD-ROM, an optical memory, and the like) that includes computer-usable program code.

Some embodiments of this disclosure are described with reference to the flowcharts and/or block diagrams of the method, the device (system), and the computer program product according to some embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to some embodiments of this disclosure without departing from the spirit and scope of this disclosure. In this way, this disclosure is also intended to cover these modifications and variations to some embodiments of this disclosure provided that they fall within the protection scope defined by the claims of this disclosure and their equivalent technologies.

What is claimed is:

1. A method for determining an index of an orthogonal basis vector, applied to a terminal, wherein the method comprises:

determining position information, wherein the position information is associated with an orthogonal basis vector; and transmitting the position information to a network device, wherein the position information is for use by the network device to determine at least one first index set, and the first index set represents a set of column indices of a plurality of orthogonal basis vectors in an orthogonal basis matrix;

wherein the position information comprises at least one start index, and the start index is a start position index of a column of an orthogonal basis vector in the orthogonal basis matrix;

or the position information comprises at least one start index and at least one second index set, the start index is a start position index of a column of an orthogonal basis vector in the orthogonal basis matrix, and the second index set is a set of offset position indices of a plurality of orthogonal basis vectors in columns of the orthogonal basis matrix relative to the start index;

wherein the first index set is associated with one or more of the start index, the second index set, an oversampling factor, an index of a layer, a row number index of a transform domain matrix, and an oversampling offset coefficient of the orthogonal basis vector, wherein the oversampling offset coefficient of the orthogonal basis vector is greater than or equal to zero and less than the oversampling factor.

2. The method according to claim 1, further comprising:

transmitting one or more of the oversampling factor, the number of indices in the first index set, and the oversampling offset coefficient of the orthogonal basis vector to the network device.

3. The method according to claim 1, wherein the start index is represented by $I_{n,i}^{r}$, and the first index set is represented by $[I_{n,i+v}^{r}\ I_{n,i+O*1+v}^{r}\ \cdots\ I_{n,i+O*(X-1)+v}^{r}]$; and $I_{n,i}^{r}$ represents that an index of the $n^{th}$ row of the transform domain matrix at the $r^{th}$ layer is i; $I_{n,i+v}^{r}$ represents that an index of the $n^{th}$ row of the transform domain matrix at the $r^{th}$ layer is i+v; $I_{n,i+O*1+v}{}^r$ represents that an index of the $n^{th}$ row of the transform domain matrix at the $r^{th}$ layer is i+O*1+v; and $I_{n,i+O*(X-1)+v}{}^r$ represents that an index of the $n^{th}$ row of the transform domain matrix at the $r^{th}$ layer is i+O*(X−1)+v, wherein O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

4. The method according to claim 1, wherein the start index is represented by $I_{n,i}{}^r$, the second index set is represented by $[I_{n,i_0+v}{}^r\ I_{n,i_1+O*1+v}{}^r\ \ldots\ I_{n,i_{X-1}+O*(X-1)+v}{}^r]$, and the first index set is represented by $[I_{n,i_0+v+i}{}^r\ I_{n,i_1+O*1+v+i}{}^r\ \ldots\ I_{n,i_{X-1}+O*(X-1)+v+i}{}^r]$; and $I_{n,i}{}^r$ represents that an index of the $n^{th}$ row of the transform domain matrix at the $r^{th}$ layer is i; $I_{n,i_0+v}{}^r$ represents that an index of the $n^{th}$ row of the transform domain matrix at the $r^{th}$ layer is $i_0$+v; $I_{n,i_1+O*1+v}{}^r$ represents that an index of the $n^{th}$ row of the transform domain matrix at the $r^{th}$ layer is $i_1$+O*1+v; and $I_{n,i_{X-1}+O*(X-1)+v}{}^r$ represents that an index of the $n^{th}$ row of the transform domain matrix at the $r^{th}$ layer is $i_{X-1}$+O*(X−1)+v, wherein O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

5. The method according to claim 1, wherein the determining position information comprises:

determining a plurality of transform domain matrices;

obtaining a plurality of N×M transform domain value matrices based on the plurality of transform domain matrices, wherein N is the number of rows of a transform domain matrix, and M is the number of columns of the transform domain matrix;

obtaining a sum matrix having a length of M based on the plurality of N×M transform domain value matrices; and determining the position information based on a position index of a greatest element in the sum matrix having the length of M.

6. The method according to claim 1, further comprising:

determining the first index set according to the position information, and sorting indices in the first index set in ascending or descending order;

determining a corresponding feedback matrix based on the transform domain matrix and the sorted first index set; and transmitting the feedback matrix to the network device.

7. A terminal, comprising a processor, a memory, and a program stored in the memory and capable of running on the processor, wherein when the program is executed by the processor, the following steps are implemented:

determining position information, wherein the position information is associated with an orthogonal basis vector; and transmitting the position information to a network device, wherein the position information is for use by the network device to determine at least one first index set, and the first index set represents a set of column indices of a plurality of orthogonal basis vectors in an orthogonal basis matrix;

wherein the position information comprises at least one start index, and the start index is a start position index of a column of an orthogonal basis vector in the orthogonal basis matrix;

or the position information comprises at least one start index and at least one second index set, the start index is a start position index of a column of an orthogonal basis vector in the orthogonal basis matrix, and the second index set is a set of offset position indices of a plurality of orthogonal basis vectors in columns of the orthogonal basis matrix relative to the start index;

wherein the first index set is associated with one or more of the start index, the second index set, an oversampling factor, an index of a layer, a row number index of a transform domain matrix, and an oversampling offset coefficient of the orthogonal basis vector, wherein the oversampling offset coefficient of the orthogonal basis vector is greater than or equal to zero and less than the oversampling factor.

8. The terminal according to claim 7, wherein when the program is executed by the processor, the following steps are further implemented:

transmitting one or more of the oversampling factor, the number of indices in the first index set, and the oversampling offset coefficient of the orthogonal basis vector to the network device.

9. The terminal according to claim 7, wherein the start index is represented by $I_{n,i}{}^r$, and the first index set is represented by $[I_{n,i_0+v}{}^r\ I_{n,i_1+O*1+v}{}^r\ \ldots\ I_{n,i_{X-1}+O*(X-1)+v}{}^r]$; and $I_{n,i}{}^r$ represents that an index of the $n^{th}$ row of the transform domain matrix at the $r^{th}$ layer is i; $I_{n,i+v}{}^r$ represents that an index of the $n^{th}$ row of the transform domain matrix at the $r^{th}$ layer is i+v; $I_{n,i+O*1+v}{}^r$ represents that an index of the $n^{th}$ row of the transform domain matrix at the $r^{th}$ layer is i+O*1+v; and $I_{n,i+O*(X-1)+v}{}^r$ represents that an index of the $n^{th}$ row of the transform domain matrix at the $r^{th}$ layer is i+O*(X−1)+v, wherein O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

10. The terminal according to claim 7, wherein the start index is represented by $I_{n,i}{}^r$, the second index set is represented by $[I_{n,i_0+v}{}^r\ I_{n,i_1+O*1+v}{}^r\ \ldots\ I_{n,i_{X-1}+O*(X-1)+v}{}^r]$, and the first index set is represented by $[I_{n,i_0+v+i}{}^r\ I_{n,i_1+O*1+v+i}{}^r\ \ldots\ I_{n,i_{X-1}+O*(X-1)+v+i}{}^r]$; and $I_{n,i}{}^r$ represents that an index of the $n^{th}$ row of the transform domain matrix at the $r^{th}$ layer is i; $I_{n,i_0+v}{}^r$ represents that an index of the $n^{th}$ row of the transform domain matrix at the $r^{th}$ layer is $i_0$+v; $I_{n,i_1+O*1+v}{}^r$ represents that an index of the $n^{th}$ row of the transform domain matrix at the $r^{th}$ layer is $i_1$+O*1+v; and $I_{n,i_{X-1}+O*(X-1)+v}{}^r$ represents that an index of the $n^{th}$ row of the transform domain matrix at the $r^{th}$ layer is $i_{X-1}$+O*(X−1)+v, wherein O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

11. The terminal according to claim 7, wherein the determining position information comprises:
  determining a plurality of transform domain matrices;
  obtaining a plurality of N×M transform domain value matrices based on the plurality of transform domain matrices, wherein N is the number of rows of a transform domain matrix, and M is the number of columns of the transform domain matrix;
  obtaining a sum matrix having a length of M based on the plurality of N×M transform domain value matrices; and
  determining the position information based on a position index of a greatest element in the sum matrix having the length of M.

12. The terminal according to claim 7, wherein when the program is executed by the processor, the following steps are further implemented:
  determining the first index set according to the position information, and sorting indices in the first index set in ascending or descending order;
  determining a corresponding feedback matrix based on the transform domain matrix and the sorted first index set; and
  transmitting the feedback matrix to the network device.

13. A network device, comprising a processor, a memory, and a program stored in the memory and capable of running on the processor, wherein when the program is executed by the processor, the following steps are implemented:
  receiving position information, wherein the position information is associated with an orthogonal basis vector; and
  determining at least one first index set based on the position information, wherein the first index set represents a set of column indices of a plurality of orthogonal basis vectors in an orthogonal basis matrix;
  the position information comprises at least one start index, and the start index is a start position index of a column of an orthogonal basis vector in the orthogonal basis matrix;
  or
  the position information comprises at least one start index and at least one second index set, the start index is a start position index of a column of an orthogonal basis vector in the orthogonal basis matrix, and the second index set is a set of offset position indices of a plurality of orthogonal basis vectors in columns of the orthogonal basis matrix relative to the start index;
  wherein the first index set is associated with one or more of the start index, the second index set, an oversampling factor, an index of a layer, a row number index of a transform domain matrix, and an oversampling offset coefficient of the orthogonal basis vector, wherein
  the oversampling offset coefficient of the orthogonal basis vector is greater than or equal to zero and less than the oversampling factor.

14. The network device according to claim 13, wherein the start index is represented by $I_{n,i}^{r}$, and the first index set is represented by $[I_{n,i_0+v}^{r}\ I_{n,i_1+O*1+v}^{r}\ \cdots\ I_{n,i_{X-1}+O*(X-1)+v}^{r}]$; and
  $I_{n,i}^{r}$ represents that an index of the $n^{th}$ row of the transform domain matrix at the $r^{th}$ layer is i; $I_{n,i+v}^{r}$ represents that an index of the $n^{th}$ row of the transform domain matrix at the $r^{th}$ layer is i+v; $I_{n,i+O*1+v}^{r}$ represents that an index of the $n^{th}$ row of the transform domain matrix at the $r^{th}$ layer is i+O*1+v; and $I_{n,i+O*(X-1)+v}^{r}$ represents that an index of the $n^{th}$ row of the transform domain matrix at the $r^{th}$ layer is i+O*(X−1)+v, wherein
  O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero;
  or,
  the start index is represented by $I_{n,i}^{r}$, the second index set is represented by $[I_{n,i_0+v+i}^{r}\ I_{n,i_1+O*1+v+i}^{r}\ \cdots\ I_{n,i_{X-1}+O*(X-1)+v+i}^{r}]$, and the first index set is represented by $[I_{n,i_0+v+i}^{r}\ I_{n,i_1+O*1+v+i}^{r}\ \cdots\ I_{n,i_{X-1}+O*(X-1)+v+i}^{r}]$; and
  $I_{n,i}^{r}$ represents that an index of the $n^{th}$ row of the transform domain matrix at the $r^{th}$ layer is i; $I_{n,i_0+v}^{r}$ represents that an index of the $n^{th}$ row of the transform domain matrix at the $r^{th}$ layer is $i_0+v$; $I_{n,i_1+O*1+v}^{r}$ represents that an index of the $n^{th}$ row of the transform domain matrix at the $r^{th}$ layer is $i_1+O*1+v$; and $I_{n,i_{X-1}+O*(X-1)+v}^{r}$ represents that an index of the $n^{th}$ row of the transform domain matrix at the $r^{th}$ layer is $i_{X-1}+O*(X-1)+v$, wherein
  O represents the oversampling factor, X represents the number of indices in the first index set, r represents an index of a layer, n represents the row number index of the transform domain matrix, v represents the oversampling offset coefficient of the orthogonal basis vector, and i is an integer greater than or equal to zero.

15. The network device according to claim 14, wherein when the program is executed by the processor, the processor further implements performing modulo M with respect to the first index set based on the position information to obtain modulo results;
  wherein the performing modulo M with respect to the first index set based on the position information to obtain modulo results comprises at least one of the following:
  if the position index $I_{n,i}^{r}$ starts from 0, performing modulo M with respect to particular elements to obtain $[\tilde{I}_{n,i_0+v}^{r}\ \tilde{I}_{n,i_1+O*1+v}^{r}\ \cdots\ \tilde{I}_{n,i_{X-1}+O*(X-1)+v}^{r}]$, wherein the particular elements are indices in $[I_{n,i+v}^{r}\ I_{n,i+O*1+v}^{r}\ \cdots\ I_{n,i+O*(X-1)+v}^{r}]$ greater than (M−1);
  if the position index $I_{n,i}^{r}$ starts from 0, performing modulo M with respect to $[I_{n,i+v}^{r}\ I_{n,i+O*1+v}^{r}\ \cdots\ I_{n,i+O*(X-1)+v}^{r}]$ to obtain $[\tilde{I}_{n,i+v}^{r}\ \tilde{I}_{n,i+O*1+v}^{r}\ \cdots\ \tilde{I}_{n,i+O*(X-1)+v}^{r}]$;
  if the position index $I_{n,i}^{r}$ starts from 1, performing modulo (M+1) with respect to particular elements to obtain $[\tilde{I}_{n,i+v}^{r}\ \tilde{I}_{n,i+O*1+v}^{r}\ \cdots\ \tilde{I}_{n,i+O*(X-1)+v}^{r}]$, wherein the particular elements are indices in $[I_{n,i+v}^{r}\ I_{n,i+O*1+v}^{r}\ \cdots\ I_{n,i+O*(X-1)+v}^{r}]$ greater than M; and
  if the position index $I_{n,i}^{r}$ starts from 1, performing modulo (M+1) with respect to $[I_{n,i+v}^{r}\ I_{n,i+O*1+v}^{r}\ \cdots\ I_{n,i+O*(X-1)+v}^{r}]$ to obtain $[\tilde{I}_{n,i+v}^{r}\ \tilde{I}_{n,i+O*1+v}^{r}\ \cdots\ \tilde{I}_{n,i+O*(X-1)+v}^{r}]$; wherein
  $\tilde{I}_{n,i+v}^{r}$ represents that an index of the $n^{th}$ row of the transform domain matrix at the $r^{th}$ layer is (i+v) modulo M or (i+v) modulo (M+1); $\tilde{I}_{n,i+O*1+v}^{r}$ represents that an index of the $n^{th}$ row of the transform domain matrix at the $r^{th}$ layer is (i+O*1+v) modulo M or (i+O*1+v) modulo (M+1); and $\tilde{I}_{n,i+O*(X-1)+v}^{r}$ represents that an index of the $n^{th}$ row of the transform domain matrix at the $r^{th}$ layer is (i+O*(X−1)+v) modulo M or (i+O*(X−1)+v) modulo (M+1);
  or,
  the performing modulo M with respect to the first index set based on the position information to obtain modulo results comprises at least one of the following:
  if the position index $I_{n,i}^{r}$ starts from 0, performing modulo M with respect to particular elements to obtain $[\tilde{I}_{n,i_0+v+i}^{r}\ \tilde{I}_{n,i_1+O*1+v+i}^{r}\ \cdots\ \tilde{I}_{n,i_{X-1}+O*(X-1)+v+i}^{r}]$, wherein the particular elements are indices in $[I_{n,i_0+v+i}^r\ I_{n,i_1+O*1+v+i}^r\ \ldots\ I_{n,i_{X-1}+O*(X-1)+v+i}^r]$ greater than (M−1);

if the position index $I_{n,i}^r$ starts from 0, performing modulo M with respect to $[I_{n,i_0+v+i}^r\ I_{n,i_1+O*1+v+i}^r\ \ldots\ I_{n,i_{X-1}+O*(X-1)+v+i}^r]$ to obtain $[\tilde{I}_{n,i_0+v+i}^r\ \tilde{I}_{n,i_1+O*1+v+i}^r\ \ldots\ \tilde{I}_{n,i_{X-1}+O*(X-1)+v+i}^r]$;

if the position index $I_{n,i}^r$ starts from 1, performing modulo (M+1) with respect to particular elements to obtain $[\tilde{I}_{n,i_0+v+i}^r\ \tilde{I}_{n,i_1+O*1+v+i}^r\ \ldots\ \tilde{I}_{n,i_{X-1}+O*(X-1)+v+i}^r]$, wherein the particular elements are indices in $[I_{n,i_0+v+i}^r\ I_{n,i_1+O*1+v+i}^r\ \ldots\ I_{n,i_{X-1}+O*(X-1)+v+i}^r]$ greater than M;

if the position index $I_{n,i}^r$ starts from 1, performing modulo (M+1) with respect to $[I_{n,i_0+v+i}^r\ I_{n,i_1+O*1+v+i}^r\ \ldots\ I_{n,i_{X-1}+O*(X-1)+v+i}^r]$ to obtain $[\tilde{I}_{n,i_0+v+i}^r\ \tilde{I}_{n,i_1+O*1+v+i}^r\ \ldots\ \tilde{I}_{n,i_{X-1}+O*(X-1)+v+i}^r]$; wherein $\tilde{I}_{n,i_0+v+i}^r$ represents that an index of the $n^{th}$ row of the transform domain matrix at the $r^{th}$ layer is $(i_0+v+i)$ modulo M or $(i_0+v+i)$ modulo (M+1); $\tilde{I}_{n,i_1+O*+v+i}^r$ represents that an index of the $n^{th}$ row of the transform domain matrix at the $r^{th}$ layer is $(i_1+O*1+v+i)$ modulo M or $(i_1+O*1+v+i)$ modulo (M+1); and $\tilde{I}_{n,i_{X-1}+O*(X-1)+v+i}^r$ represents that an index of the $n^{th}$ row of the transform domain matrix at the $r^{th}$ layer is $(i_{X-1}+O*(X-1)+v+i)$ modulo M or $(i_{X-1}+O*(X-1)+v+i)$ modulo (M+1).

\* \* \* \* \*